(12) United States Patent
Fiske

(10) Patent No.: US 8,966,899 B2
(45) Date of Patent: *Mar. 3, 2015

(54) SYSTEM AND METHOD FOR STORING ENERGY

(75) Inventor: O. James Fiske, Goleta, CA (US)

(73) Assignee: Launchpoint Technologies, Inc., Goleta, CA (US)

(*) Notice: Subject to any disclaimer, the term of this patent is extended or adjusted under 35 U.S.C. 154(b) by 240 days.

This patent is subject to a terminal disclaimer.

(21) Appl. No.: 13/367,283

(22) Filed: Feb. 6, 2012

(65) Prior Publication Data

US 2012/0134790 A1    May 31, 2012

Related U.S. Application Data

(62) Division of application No. 12/365,848, filed on Feb. 4, 2009, now Pat. No. 8,166,760.

(60) Provisional application No. 61/026,657, filed on Feb. 6, 2008, provisional application No. 61/081,340, filed on Jul. 16, 2008, provisional application No. 61/140,921, filed on Dec. 26, 2008.

(51) Int. Cl.
*F03B 7/00*     (2006.01)
*F03C 1/00*     (2006.01)
(Continued)

(52) U.S. Cl.
CPC ............... *F03D 9/026* (2013.01); *F03D 1/001* (2013.01); *F03D 1/005* (2013.01); *F03D 9/025* (2013.01); *F03G 3/00* (2013.01); *F05B 2240/9151* (2013.01); *F05B 2240/95* (2013.01); *F05B 2260/4031* (2013.01); *F05B 2260/406* (2013.01);
(Continued)

(58) Field of Classification Search
USPC .............. 60/639–640, 495–507, 641.2–641.4
See application file for complete search history.

(56) References Cited

U.S. PATENT DOCUMENTS 4,100,743 A * 7/1978 Trumbull et al. ............... 60/639
4,202,178 A * 5/1980 Peterman et al. ............... 60/675
(Continued)

FOREIGN PATENT DOCUMENTS

JP          06-147097          5/1994

OTHER PUBLICATIONS

US Office Action dated Sep. 25, 2013, from related U.S. Appl. No. 13/457,324.
(Continued)

*Primary Examiner* — Hoang Nguyen
(74) *Attorney, Agent, or Firm* — Foley & Lardner LLP

(57) ABSTRACT

A system includes at least one body, a link for suspending the body for movement with gravity from a first elevation position to a second elevation position, and an electrical energy generator coupled with the body through the link to drive the generator to generate electricity upon movement of the body with gravity from the first to the second elevation position. The at least one body has a mass of at least approximately 100 tonnes; the first and the second elevation positions define a distance therebetween of at least approximately 200 meters; and/or the system further includes an operator configured to operate the link to controllably move the at least one body against gravity from the second to the first elevation position to increase a gravitational potential energy of the at least one body, and to maintain the gravitational potential energy of the at least one body.

22 Claims, 23 Drawing Sheets

(51) Int. Cl.
*F03D 9/02* (2006.01)
*F03D 1/00* (2006.01)
*F03G 3/00* (2006.01)

(52) U.S. Cl.
CPC .............. *Y02E 10/725* (2013.01); *Y02E 10/728* (2013.01); *Y02E 60/16* (2013.01); *Y02E 60/17* (2013.01); *Y02E 10/727* (2013.01)
USPC .................... 60/639; 60/496; 60/500; 60/502

(56) References Cited

U.S. PATENT DOCUMENTS

| | | | |
|---|---|---|---|
| 4,713,210 A | 12/1987 | Germer | |
| 4,769,208 A | 9/1988 | Germer | |
| 4,919,881 A | 4/1990 | Hankinson et al. | |
| 5,042,861 A | 8/1991 | Trundle et al. | |
| 5,377,239 A | 12/1994 | Nopwaskey et al. | |
| 5,600,685 A | 2/1997 | Izzo et al. | |
| 5,712,456 A | 1/1998 | McCarthy et al. | |
| 5,960,051 A | 9/1999 | Challberg et al. | |
| 6,047,037 A | 4/2000 | Wivagg | |
| 6,501,813 B1 | 12/2002 | Soma et al. | |
| 6,556,641 B2 | 4/2003 | Maehara et al. | |
| 6,817,180 B2 * | 11/2004 | Newman | 60/639 |
| 7,134,283 B2 * | 11/2006 | Villalobos | 60/639 |
| 8,166,760 B2 * | 5/2012 | Fiske | 60/639 |
| 2005/0173198 A1 | 8/2005 | Takehara et al. | |
| 2009/0129528 A1 | 5/2009 | Johnson | |

OTHER PUBLICATIONS

US Notice of Allowance dated Jan. 24, 2014, from related U.S. Appl. No. 13/457,324.
Canadian Office Action dated Feb. 19, 2014, from related Canadian patent application No. 2,713,742.
Mexican Office Action dated May 8, 2014, from related Mexican patent application No. MX/a/2010/008494.

* cited by examiner

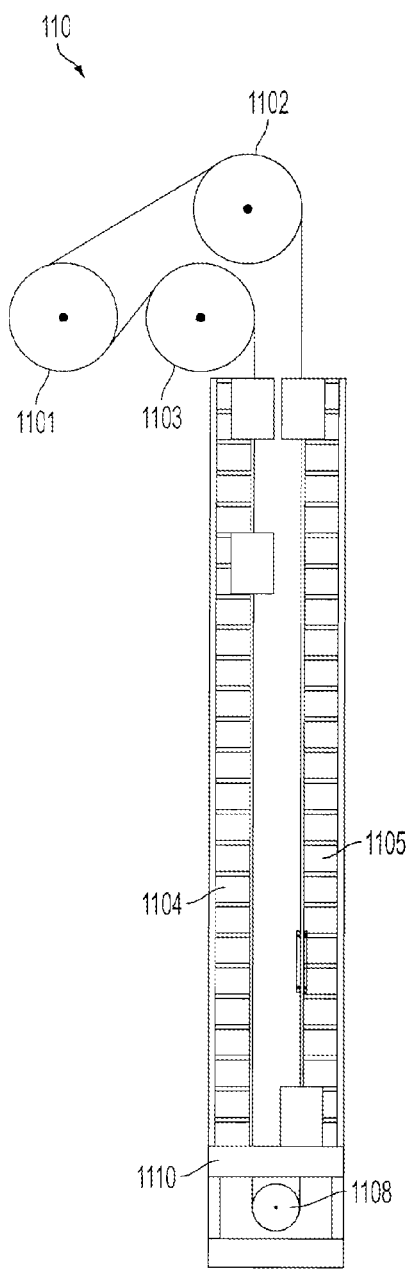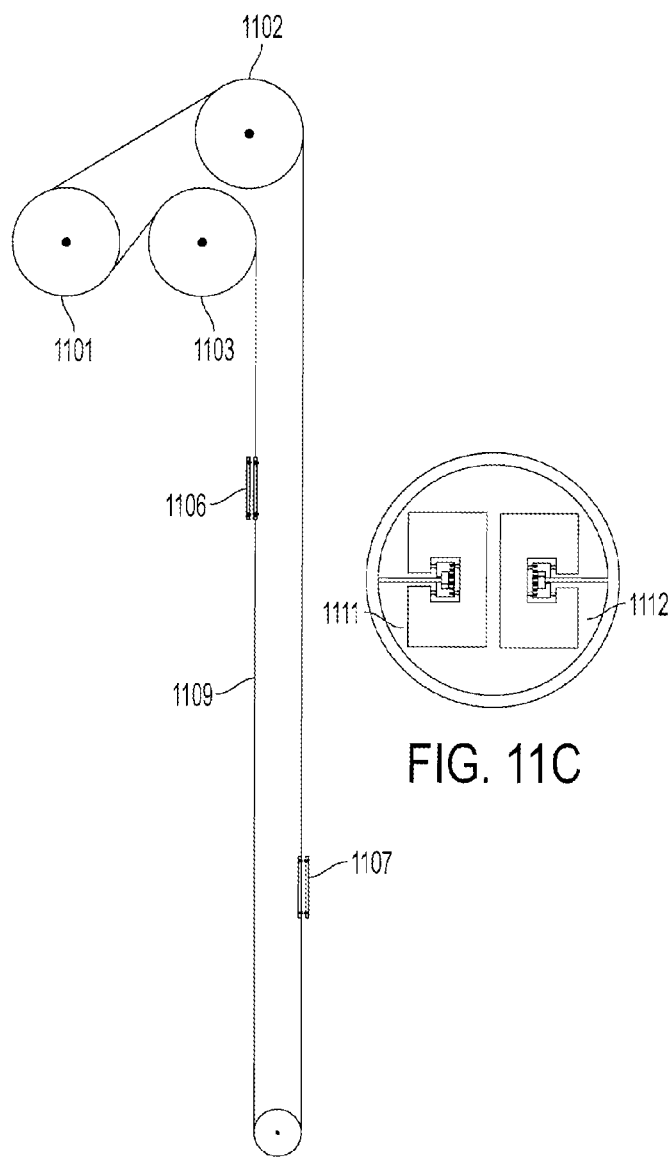
FIG. 11A  FIG. 11B  FIG. 11C

SYSTEM AND METHOD FOR STORING ENERGY

CROSS-REFERENCE TO RELATED PATENT APPLICATIONS

This is a divisional application of U.S. patent application Ser. No. 12/365,848, filed on Feb. 4, 2009, now U.S. Pat. No. 8,166,760 which claims priority to and the benefit of U.S. Provisional Patent Application No. 61/026,657, filed Feb. 6, 2008, U.S. Provisional Patent Application No. 61/081,340, filed Jul. 16, 2008, and U.S. Provisional Patent Application No. 61/140,921, filed Dec. 26, 2008, the contents of all of which are incorporated herein by reference in their entireties.

FIELD OF THE INVENTION

Embodiments of the present invention relate to systems and methods for storing energy. Embodiments may be used, for example, to store energy generated during "off-peak" periods (i.e., time periods during which energy demands are lower relative to "peak" periods) and/or energy generated from renewable sources, such as, but not limited to, wind. In a particular embodiment, an energy storage system is configured for operation on land. In another particular embodiment, an energy storage system is configured for operation in an aquatic body, such as, but not limited to, an ocean.

BACKGROUND

Providing adequate energy to power all the various needs of society is becoming more problematic every year. Conventional sources such as coal, petroleum and gas, are becoming more expensive and harder to find. At the same time, the byproducts of combustion produce air pollution and elevate atmospheric carbon dioxide, threatening severe consequences for the global environment.

A technology currently capable of providing high capacity energy storage is pumped hydro. An example of this technology is shown in the system 10 of FIG. 1. With reference to FIG. 1, the system employs two large water reservoirs 102 and 105 located at different elevations with respect to each other. Water 106 is pumped by pump 101 from the lower reservoir 102 to the higher reservoir 105 whenever excess energy is available, and the excess energy (minus any losses due to inefficiencies) is stored in the system 10. (The excess energy is generated by power grid 108 and powers electric motor 100 via substation 107.) Energy stored in the system 10 is released as follows. Water 106 is released from the higher reservoir 105 through hydraulic turbine 103 into the lower reservoir 102 to produce mechanical energy. The mechanical energy is converted into electric energy by generator 104 and provided to the power grid 108 via substation 107.

Large-scale installations of systems such as system 10 can provide a peak output power of more than 1000 megawatts (MW) and a storage capacity of thousands of megawatt-hours (MW-H). Pumped hydro has been a common bulk storage technology for decades, providing capacity worldwide. However, geographic, geologic and environmental constraints associated with the design of reservoirs for such systems, in addition to increased construction costs, have made this technology much less attractive for future expansion. Thus, this technology may not provide a practical method to provide the wide applicability, capacity, low cost and environmental compatibility required to support the needs of future expansion, which may include, for example, a conversion of the energy infrastructure from hydrocarbon sources to renewable sources of energy.

SUMMARY OF THE DISCLOSURE

Embodiments of the present invention are directed to energy storage systems that can serve as reliable, dispatchable baseload power supplies, as well as intermittent production supplies. In particular embodiments, the systems may harness renewable sources of energy, such as, but not limited to, that collected by solar panels and wind turbines. According to embodiments of the present invention, a significant fraction of the output from solar- and/or wind-energy devices may be directed into large-scale energy storage units, which may then release that energy as needed.

Relative to technologies such as pumped hydro, embodiments of the present invention are directed toward expanding the range of suitable locations where energy storage can be carried out. Features of embodiments of the invention include: high power potential (1000 megawatts or more); large energy storage capacity (including, but not limited to, 8 hours or more at rated power); minimization of adverse environmental impact; and proximity to power transmission lines or a large electricity market, such as, but not limited to, a city.

In the case of pumped hydro, it may be difficult to locate sites capable of providing all or some of these features. Embodiments of the present invention are directed to expanding the range of suitable installation sites to exploit locations that exist in greater numbers near many of the major cities of the U.S. and the world.

According to one embodiment, a system for storing energy includes at least one body, a link for suspending the at least one body for movement with gravity from a first elevation position to a second elevation position, and an electrical energy generator coupled with the at least one body through the link to drive the electrical energy generator to generate electricity upon movement of the at least one body with gravity from the first elevation position to the second elevation position. The at least one body has a mass of at least approximately 100 tonnes; (b) the first elevation position and the second elevation position define a distance therebetween of at least approximately 200 meters; and/or (c) the system further includes an operator configured to operate the link to controllably move the at least one body against gravity from the second elevation position to the first elevation position to increase a gravitational potential energy of the at least one body, and to maintain the gravitational potential energy of the at least one body.

According to another embodiment, a method for storing energy includes providing a link for suspending at least one body for movement with gravity from a first elevation position to a second elevation position, and coupling an electrical energy generator with the at least one body through the link to drive the electrical energy generator to generate electricity upon movement of the at least one body with gravity from the first elevation position to the second elevation position. The at least one body has a mass of at least approximately 100 tonnes; (b) the first elevation position and the second elevation position define a distance therebetween of at least approximately 200 meters; and/or (c) the method further includes configuring an operator to operate the link to controllably move the at least one body against gravity from the second elevation position to the first elevation position to increase a gravitational potential energy of the at least one body, and to maintain the gravitational potential energy of the at least one body.

These and other aspects will become apparent from the following drawings and detailed description of exemplary embodiments.

BRIEF DESCRIPTION OF THE DRAWINGS

FIGS. 11A, 11B and 11C depicts a friction drive hoist system according to one embodiment.

FIG. 12A shows a cross-sectional view of a buoyant platform according to one embodiment.

DETAILED DESCRIPTION

The following detailed description is of the best presently contemplated mode of implementing embodiments of the invention. This description is not to be taken in a limiting sense, but is made merely for the purpose of illustrating general principles of embodiments of the invention. The scope of the invention is best defined by the appended claims.

Embodiments of the present invention relate to systems and methods for storing energy that may be used, for example, to store energy generated during "off-peak" periods (i.e., time periods during which energy demands are less heavy relative to "peak" periods) and/or energy generated from renewable sources, such as wind and the sun. In particular embodiments, methods and systems for storing energy are configured for operation on land. In other particular embodiments, methods and systems for storing energy are configured for operation in an aquatic environment, such as, but not limited to, in the ocean.

According to one embodiment, the energy demand of the "peak" period is considered to be about 50% higher than the energy demand of the off-peak period. According to other embodiments, the energy demand of the "peak" period can be defined at other suitable levels, including, but not limited to, about 100% or 200% higher than the energy demand of the off-peak period.

One aspect of the invention involves storing off-peak energy and/or renewable energy for use during peak periods. As such, according to embodiments of the invention, energy storage systems can serve as reliable, dispatchable baseload power supplies, as well as intermittent production supplies. According to particular embodiments of the present invention, a significant portion of the output from solar and/or wind sources are directed into energy storage systems, which may then release that energy, for example, on an as-needed basis.

Figure 1:
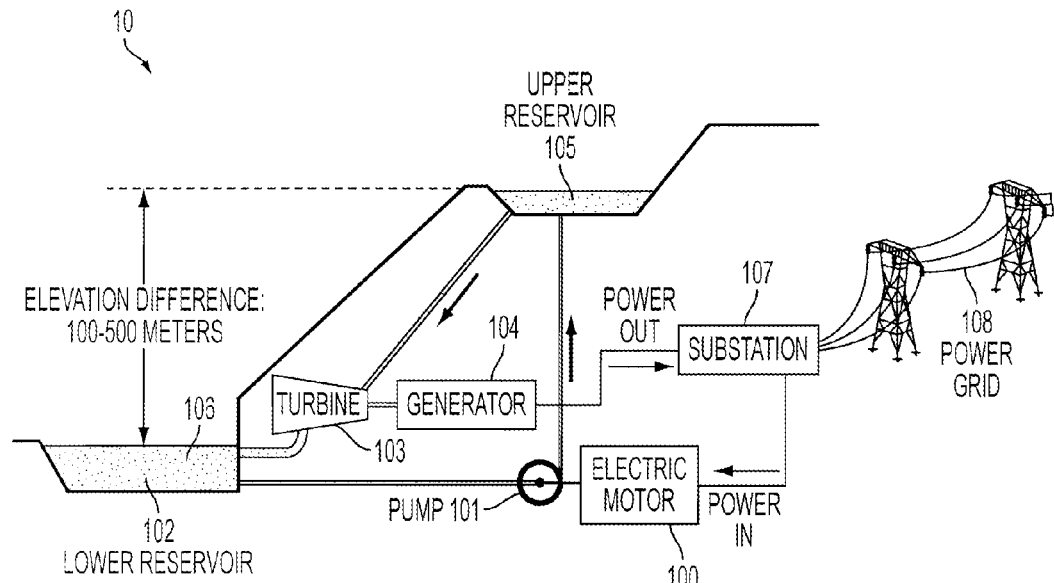
FIG. 1 is a generalized schematic diagram of a pumped hydro energy storage system.
Figure 2:
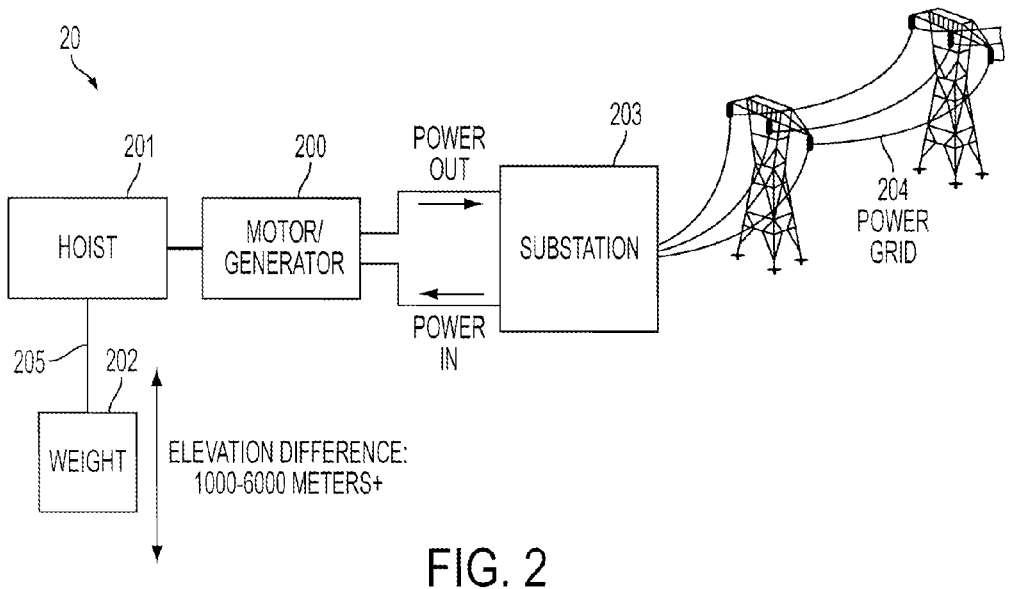
FIG. 2 is a generalized schematic diagram of an energy storage system according to one embodiment.

A generalized diagram of a system 20 according to embodiments of the present invention is shown in FIG. 2. Example embodiments of the system 20 are described herein with reference to land- and water-based applications. With reference to FIG. 2, a storage weight 202 is suspended by a link 205 for movement along a generally vertical path. In particular embodiments, the path is substantially vertical (i.e., parallel to the direction of gravitational force). In other embodiments, the path may be angled, with a vertical component—e.g., the path is angled downward. In particular embodiments, the path may have a suitable vertical length such as, but not limited to, a length of around 1000 meters or more. In a particular embodiment, the vertical length of the path is around 6000 meters. According to one embodiment, the weight 202 is constructed of a dense material such as, but not limited to, concrete, reinforced concrete and/or steel. According to particular embodiments, the mass of the weight 202 is at least approximately 100 tonnes, or is at least approximately 1,000 tonnes. To reduce costs, the dense material may be a relatively low cost material. According to particular embodiments, the link 205 may be any suitable connection structure such as, but not limited to, a cable, a wire, a rope, a belt or a chain.

An operator 201 is coupled with the link 205. The operator 201 operates the link 205 to move the weight 202 against gravity, as will be described in more detail below. According to one embodiment, the operator 201 is a hoist. The hoist 201 may be coupled with a motor 200 for driving the hoist 201. In some embodiments, the motor 200 is coupled with (or can operate as) the generator. The motor and/or generator 200 may be coupled with the substation 203.

The substation 203 is for converting power from a "transmission" source to a "distribution" target. In more detail, the substation 203 may include transformers that step transmission voltages (e.g., in the range of tens or hundreds of thousands of volts) down to distribution voltages, which, for example, may be less than 10,000 volts. The substation 203 may have a bus that can split the distribution power into multiple directions. The substation 203 may also have circuit breakers and switches such that the substation 203 can be disconnected from transmission sources and/or distribution targets, if desired.

The substation 203 is coupled with an electric power transmitter, such as, but not limited to, a power grid 204. The power grid 204 may serve as a source of power for the system 20. In other embodiments, the source of power may be one or more devices for capturing renewable energy such as, but not limited to, a wind turbine or a solar panel. The power grid 204 may also receive power released by the system 20 and carry that power to a target.

With continued reference to FIG. 2, in operation, power is provided by the source, e.g., power grid 204. In embodiments where the power is provided by an industrial source such as the power grid, the power is transformed by substation 203 for suitable use by the motor 200. The motor 200 drives the hoist 201 to raise the storage weight 202 from a first elevation (a location farther from the hoist 201) to a second elevation (a location closer to the hoist 201). As such, the gravitational potential energy of the storage weight 202 is increased, and the increase in energy is stored in the system (e.g., by maintaining the gravitational potential energy of the storage weight 202).

The stored energy is released when the storage weight 202 is lowered. The lowering of the storage weight turns the drum of the hoist 201, which effectively drives the motor/generator 200 to produce electrical energy. The electrical energy is conditioned by the substation 203 for transmission by the power grid 204.

As such, energy that is generated during off-peak periods (e.g., periods of the days during which energy is in relatively low demand) may be stored in system 20 for later use (e.g., peak periods of the day during which energy is in relatively high demand). For example, such off-peak energy may be used to raise the storage weight 202 to the second elevation during off-peak periods. As such, the off-peak energy (or a significant portion of the off-peak energy) is stored in the system 20. The stored energy can be released during peak periods by releasing the weight 202 such that it falls back to the first elevation, thereby producing energy for use during the peak periods.

The system 20 is configurable to store a desired amount (or desired amounts) of energy. For example, a certain amount of energy can be stored in such a system, if the mass of the weight 202 and/or the vertical length of the path (i.e., the path along which the weight 202 is lowered and raised) are configured accordingly. For example, in the case of a weight made of concrete, because concrete has a density of approximately 2500 kilograms (kg) per cubic meter, such a weight provides a downward force of about 24,525 Newtons (N) per cubic meter. The energy (work) released by lowering one cubic meter of concrete through 1000 meters of elevation may be calculated as:

$$W = \text{Force} \times \text{distance} = 24{,}525\ N \times 1{,}000\ m = 24.525\ \text{megajoules} = \sim 6.8\ \text{kilowatt-hours}$$

According to one embodiment, the weight 202 is lowered (or raised) at a generally constant speed such that the energy is released (or stored) at a correspondingly constant rate. According to other embodiments, the weight 202 is lowered (or raised) at two or more different speeds—for example, at one speed during an initial 500 meters and at another speed during the remainder of the path—such that the energy is released (or stored) at two corresponding rates. For example, during an initial portion of the path, the weight may be lowered at a certain speed, and, then, during a second portion of the path following the initial portion, the weight is lowered at half the speed of the initial portion. As such, during the second portion, energy is produced at a rate approximately half the rate at which energy is produced during the initial portion. This may correspond to a greater demand for energy during the time of the initial portion relative to the demand for energy during the time of the second portion. According to yet other embodiments, the lowering (or raising) of the weight 202 is accelerated or decelerated such that the rate at which the energy is released (or stored) is also correspondingly accelerated or decelerated.

According to one embodiment, the storage efficiency (i.e., the ratio of the power that is generated by the system 20 to the power that is stored in the system 20) is improved by lowering the weight 202 at relatively modest speeds to minimize (or at least reduce) drag losses incurred as the weight 202 is lowered.

Figure 3:
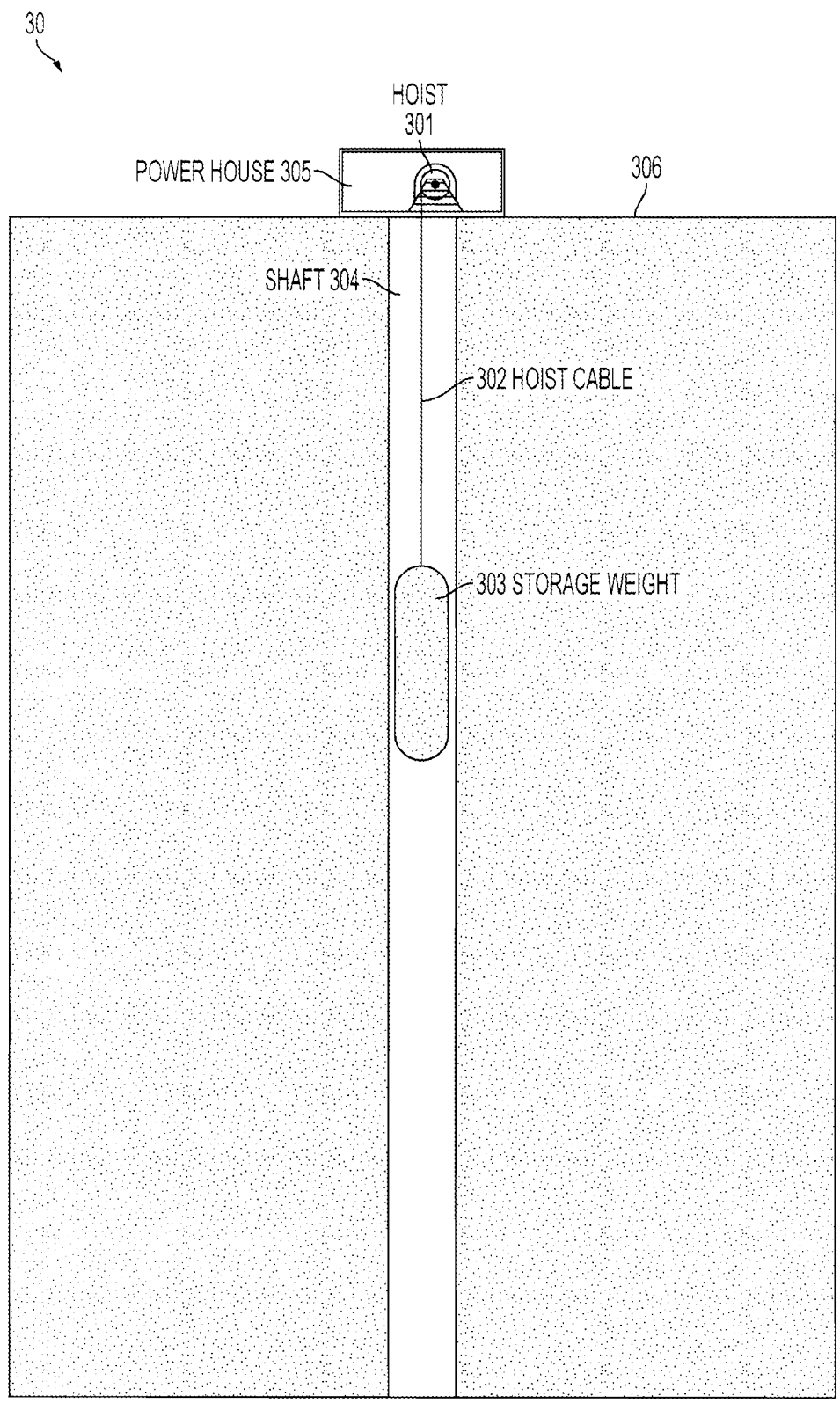
FIG. 3 depicts an energy storage system according to one embodiment.

A side view of an embodiment of a system 30 that is installed on land is shown in FIG. 3. With reference to FIG. 3, a power house 305 is supported on the land surface 306. The power house 305 may be positioned directly on the land surface 306. In other embodiments, the power house 306 may be positioned above the land surface—e.g., on a platform such that the power house rests above the land surface. The power house 305 may be coupled with devices/systems such as the substation 203 and power grid 204 of FIG. 2.

The power house 305 includes a hoist 301. The hoist 301 is coupled with a hoist cable 302 that may be wrapped around the drum of the hoist 301. A weight 303 is suspended by the hoist cable 302. In other embodiments, a belt or chain may be used in place of a cable to suspend the weight 303. The weight is suspended such that it can be lowered and raised within the shaft 304. As will be described in more detail below, the shaft 304 may be formed in a location such as, but not limited to, a salt dome. According to one embodiment, the orientation of the shaft 304 is generally vertical (i.e., parallel to the direction of gravitation force). According to other embodiments, the orientation of the shaft may be angled with a vertical component corresponding to the angle. According to a further embodiment, the depth of the shaft 304 is between approximately 1000 and 6000 meters.

Similar to the system of FIG. 2, the hoist 301 may be coupled to a motor/generator to produce electric power for transmission to a grid (e.g., power grid 204 of FIG. 2) via transmission lines. According to a further embodiment, a gearbox is coupled between the hoist 301 and motor/generator to multiply the motor/generator rotation rate. According to yet another embodiment, a power conditioning system (e.g., power substation 203 of FIG. 2) is coupled between the motor/generator and the grid to convert the generator output to a proper (or suitable) form for transmission to the grid and/or to convert electric power from the grid into the proper form to drive the motor.

With reference to FIG. 3, energy is stored in the system 30 when the hoist 301 is driven (e.g., using electricity from a power grid which powers the motor/generator) to lift the storage weight 303 against gravity to a first elevation. Energy stored in the system 30 is released when the storage weight 303 is allowed to be released such that it moves with gravity. Because the weight 303 continues to be coupled with the hoist 301 via hoist cable 302, the hoist 301 is turned when the weight 303 moves down the shaft 304. The movement of the weight 303 turns the hoist 301, thereby generating power, as previously described.

As previously described with reference to FIG. 2, a weight of a system may be lowered (or raised) at two or more different speeds. With reference to FIG. 3, in one embodiment, a speed at which the weight 303 is raised by hoist 301 is controlled electronically. For example, according to one embodiment, a motor/generator for driving hoist 301 is controlled by a control circuit coupled with the motor/generator to control the rate at which hoist cable 302 is drawn in by hoist 301. According to another embodiment, such a control circuit may be coupled with the hoist 301 to control such a rate.

Figure 21:
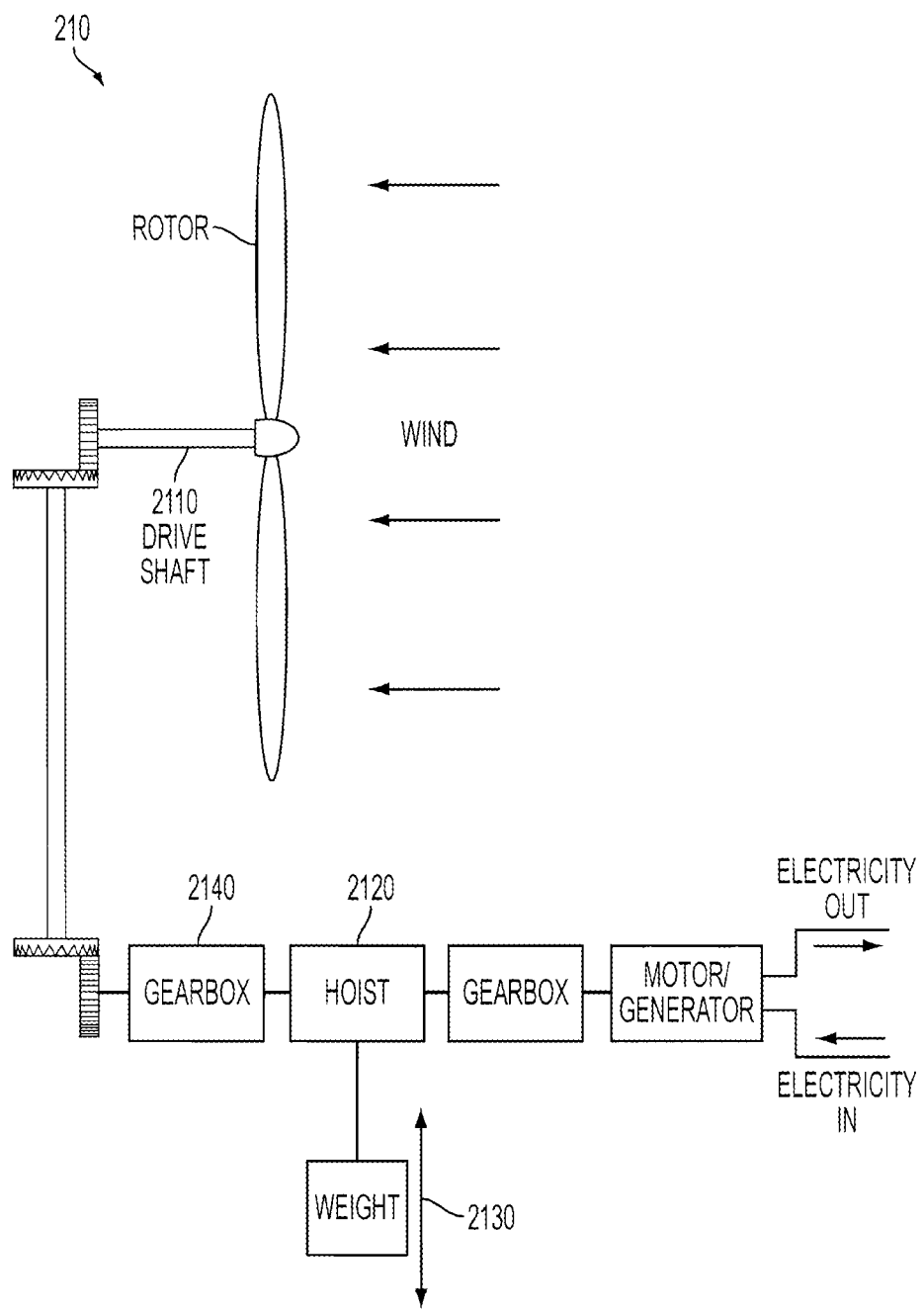
FIG. 21 is a generalized schematic diagram of an energy storage system according to one embodiment.

With continued reference to FIG. 3, in one embodiment, a speed at which the weight 303 is lowered by hoist 301 is controlled by configuring an operating frequency of a generator (e.g., generator 200 of FIG. 2) coupled with the hoist. Configuring the operating frequency to be of a certain value correspondingly sets the speed at which the weight 303 is lowered. Alternatively, if such a generator is synchronous with a power grid (e.g., power grid 204 of FIG. 2), the gear ratio of a gearbox may be configured to control the speed at which the weight 303 is lowered. For example, according to one embodiment, a gearbox may be coupled between the hoist 301 and the generator (see, for example, FIG. 21). Configuring the gear ratio of such a gearbox to be of a certain value correspondingly sets the speed at which the weight 303 is lowered.

With continued reference to FIG. 3, in an alternative embodiment, a speed at which the weight 303 is lowered by hoist 301 is controlled by or using a mechanical structure. For example, according to one embodiment, a dampening structure (providing, for example, one or more levels of dampening) is provided to control the rate at which hoist cable 302 is drawn out from hoist 301. Such a dampening structure may include, but is not limited to, an adjustable clamp configurable to increase the rotation resistance of the drum of hoist 301. According to another embodiment, the hoist 301 includes a structure for setting such a resistance (such as, but not limited, a screw that may be tightened or loosened). The dampening structure described above may be operable manually (e.g., from a location accessible to a human operator) or by an electronically controllable device such as an actuator.

Construction costs associated with the system 30 may be reduced, for example, by reducing the cost of constructing the generally vertical shaft (e.g., shaft 304 of FIG. 3). The costs associated with constructing the shaft may depend upon the availability of subsurface strata through which such a shaft can be bored more easily.

According to one embodiment, the shaft is constructed in a site having a suitably large deposit of a relatively soft material—e.g., a soft mineral. According to a particular embodiment, the shaft is constructed in a salt dome. Salt domes are salt deposits that, for example, can have a cross-sectional diameter of ten kilometers and a depth of six kilometers (or more). They may consist primarily of crystallized sodium chloride (i.e., rock salt), which is a very soft mineral.

Figure 4:
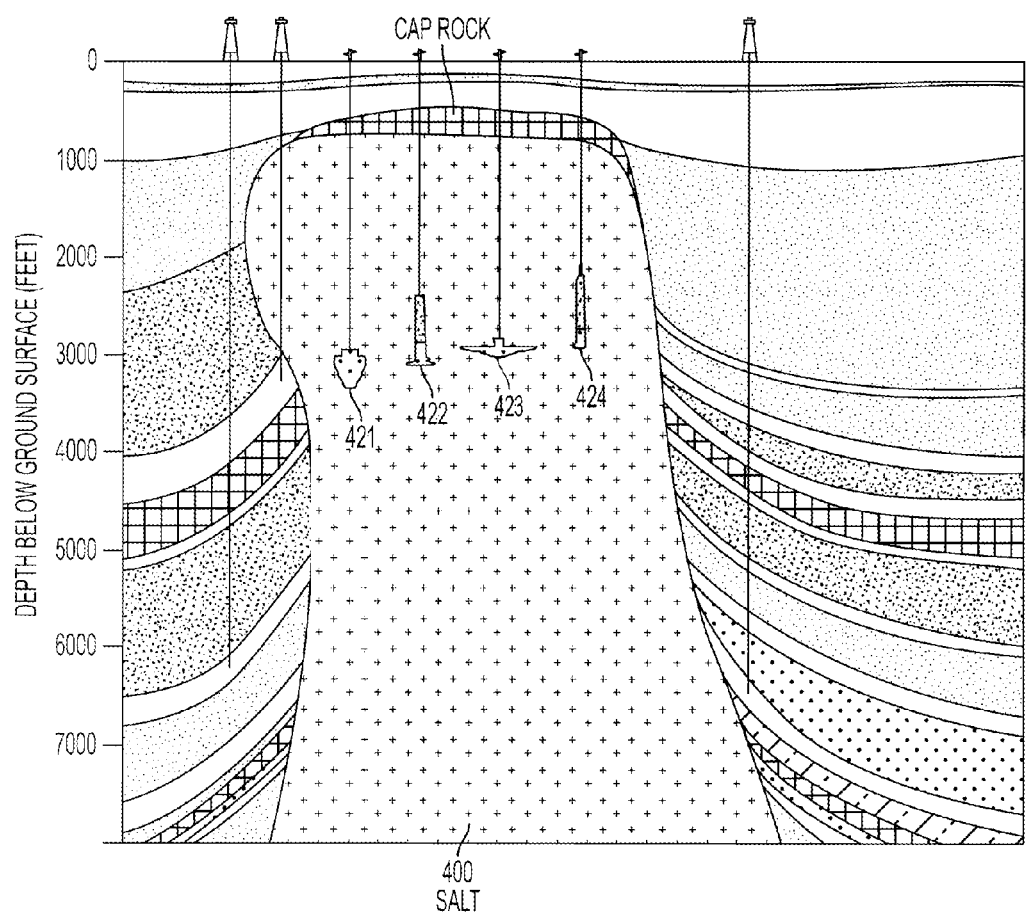
FIG. 4 depicts a salt dome.

With reference to FIG. 4, a cross-sectional view of a site having a salt dome 400 is shown. The salt dome may be located adjacent to multiple layers of subsurface strata. The layers of subsurface strata may be of a different material having a level of hardness different from that of rock salt.

According to one embodiment, an example of a suitable salt dome is one in which caverns are commonly created using solution mining. Such a salt dome is commonly used to store natural gas or petroleum products (e.g., caverns 421, 422, 423, 424 of FIG. 4).

Figure 5:
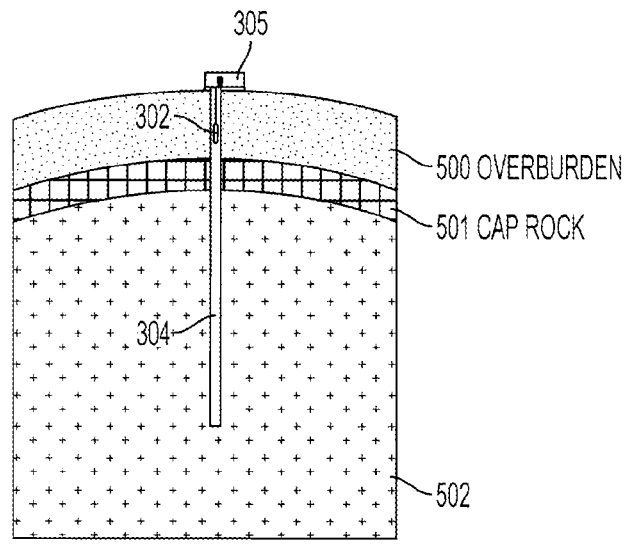
FIG. 5 depicts an energy storage system according to one embodiment.

With reference to FIG. 5, a storage system according to one embodiment is shown. The power house 305 is installed at (or near) the top of the shaft 304 and a storage weight 302 is suspended for movement along the vertical dimension of the shaft. Portions of the shaft may be surrounded by overburden 500 and caprock 501. A primary portion of the shaft may be surrounded by the salt dome 502. Such a shaft can be constructed, for example, using a shaft boring machine, with cuttings carried to the surface by drilling mud. According to one embodiment, at least portions of the shaft are lined with a reinforcing material such as, but not limited to, concrete, steel or a similar material to minimize the likelihood of collapse or ground intrusion.

At the locations of some salt domes, the large shaft depth achievable and the ease of shaft construction provide the potential for large storage capacity per shaft constructed. For example, a shaft having a cross-sectional diameter of 10 meters and a depth of 6 kilometers would provide sufficient space for a concrete storage mass of more than 100,000 tonnes, thereby providing a storage capacity on the order of three gigawatt-hours.

Figure 6:
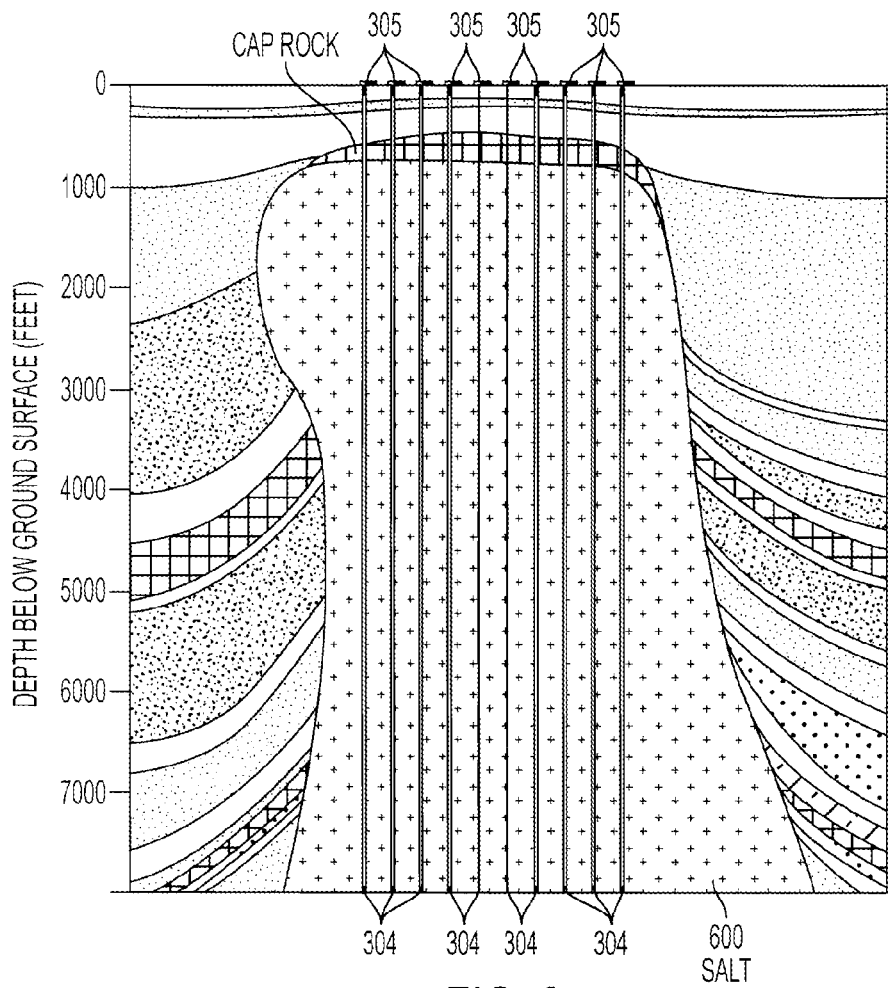
FIG. 6 depicts an energy storage system according to one embodiment.

Due to the relatively large cross-sectional diameter of some salt domes, salt domes can accommodate two or more systems (e.g., system 30) according to embodiments of the present invention. With reference to FIG. 6, a salt dome 600 accommodating multiple shafts 304, each shaft corresponding to a power house 305, is shown. (Adjacent (or neighboring) shafts and power houses are spaced apart from each other by a suitable distance.) For example, a salt dome having a cross-sectional diameter of 2 kilometers has a cross-sectional area of about 3 square kilometers. If the "footprint" of each power house 305 (which may provide sufficient access to the power house) occupies approximately 250 square meters, the salt dome can accommodate a total of 12,000 power house/shaft pairings. If each of these pairings provides 25 megawatts of power for eight hours, or 200 megawatt-hours, the total capacity of the site would be 300 gigawatts for 8 hours, or 2,400 gigawatt-hours.

Figure 7:
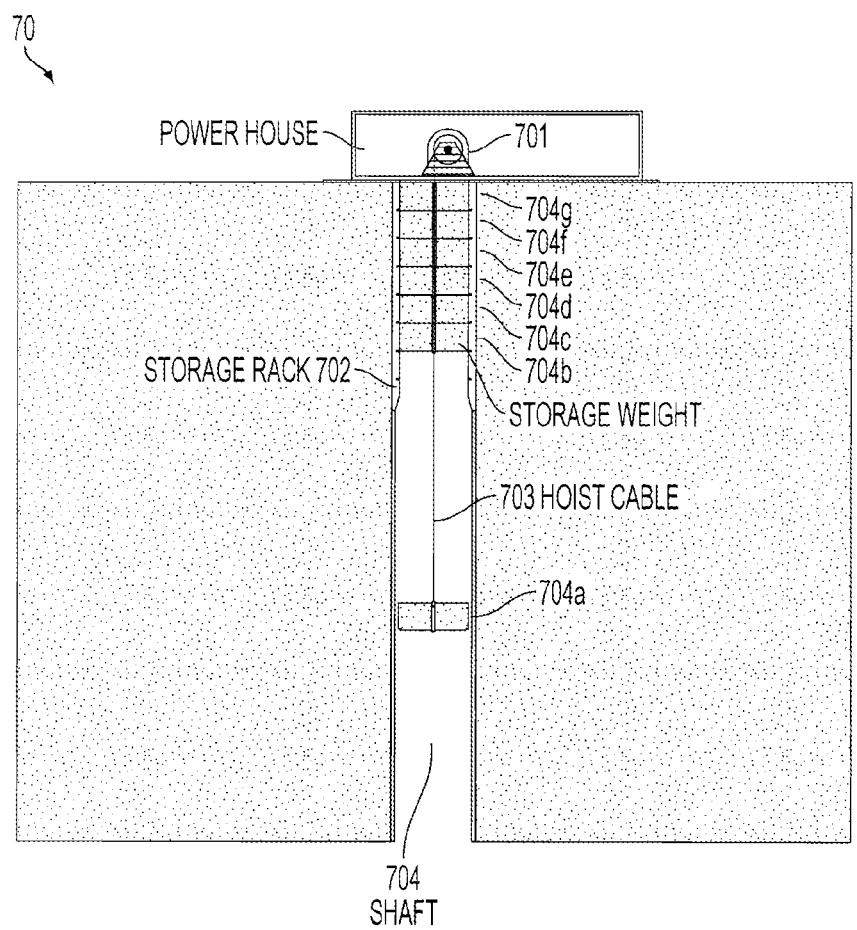
FIG. 7 depicts an energy storage system according to one embodiment.

According to one embodiment, a system is configured to lower and raise two or more weights. For example, the weights are lowered or raised by a hoist assembly individually (e.g., one at a time). With reference to FIG. 7, a group of storage weights 704a, 704b, 704c, 704d, 704e, 704f, and 704g are manipulated in the system. The individual weights may be coupled to hoist assembly 701 via hoist cable 703. According to one embodiment, the weights are generally equal in mass relative to each other and generally similar in size and shape. According to another embodiment, the weights have different masses relative to each other and/or have difference sizes and shapes. As explained previously, the masses of the weights may be chosen to provide the amount of energy that is generated (or stored) when the weight is lowered (or raised) from (or to) the higher elevation.

At the higher elevation, the weights 704b-704g are supported by a rack 702 located at (or near) the top of the shaft 704. An example of a rack 702 will be described in more detail below with reference to FIG. 9. At the lower elevation, the weights may rest on each other and/or a base (e.g., base 806 of FIG. 8B) located at (or near) the bottom of the shaft 704.

Figure 8A:
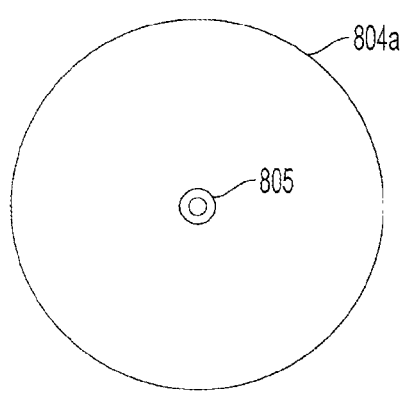
FIGS. 8A and 8B respectively show a top view and a side view of storage weights according to one embodiment.

With reference to FIG. 8A, a top view of storage weight 804a is shown according to one embodiment. According to one embodiment, the storage weight 804a has a circular cross-section. According to other embodiments, the storage weight has an oval, square, or rectangular cross-section. The weight 804a may have a receptacle 805 for interfacing with the hoist cable (e.g., hoist cable 703 of FIG. 7) to facilitate raising and lowering of the weight 804a along the shaft. According to one embodiment, the weight is constructed of concrete, reinforced concrete or another suitably dense material. According to one embodiment, the grapple receptacle 805 is formed of a durable material such as, but not limited to, steel.

Figure 8B:
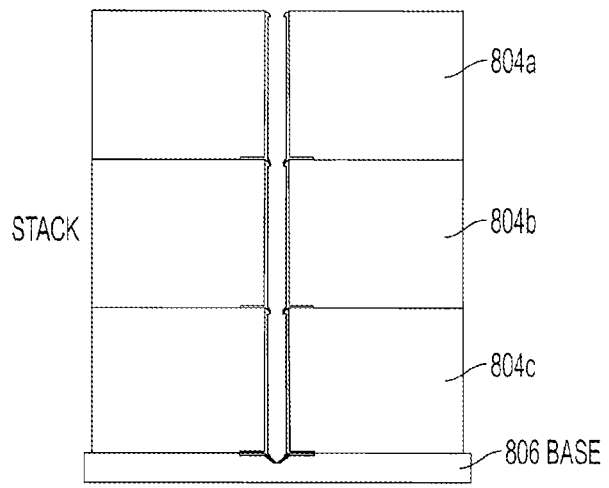

With reference to FIG. 8B, a cross-sectional view of a stack of storage weights in the lowered configuration is shown according to one embodiment. The weight 804c is positioned to rest directly on base 806. Weights 804b and 804a are positioned to rest, respectively, on weight 804c and 804b.

Figure 9:
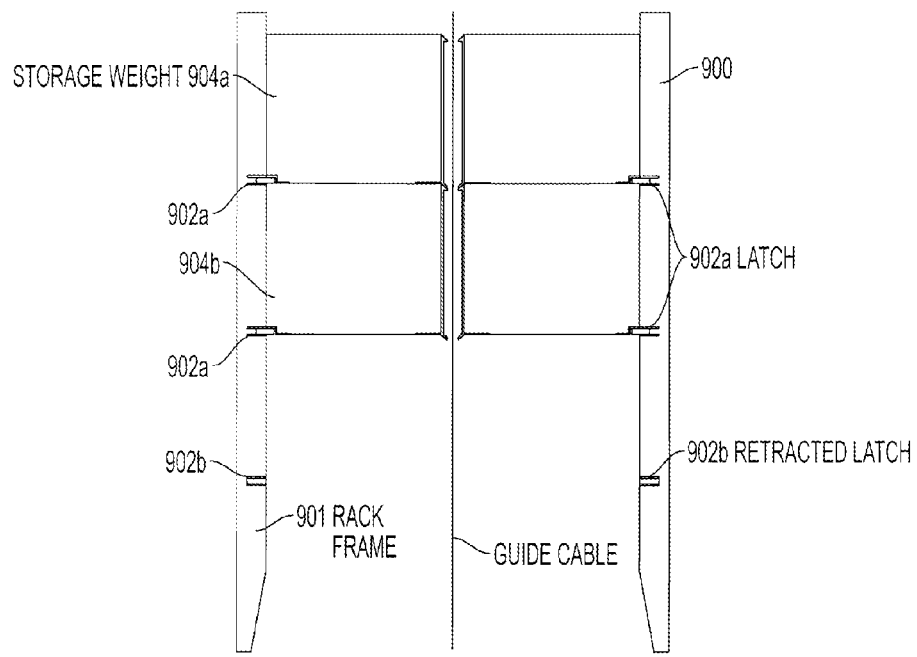
FIG. 9 depicts a storage rack according to one embodiment.

As previously described, at the higher elevation, the weights may be supported by a storage rack located at the top of the shaft. With reference to FIG. 9, a cross-sectional view of a storage rack 900 according to one embodiment is shown. The storage rack has a frame 901 that is sized to be positioned inside a shaft (e.g., shaft 704 of FIG. 7). The frame may include, for example, a cylindrical pipe-like structure or other suitable structure forming one or more walls around the periphery of the shaft (e.g., shaft 704), at least along a portion of the length of the shaft.

According to one embodiment, the frame 901 is configured to provide one or more walls adjacent opposite edges of each of the weights. According to one embodiment, the frame 901 includes latches 902 (e.g., latches 902a and 902b) including retractable protruding members that are controllable to extend from and retract into the frame 901. The latches 902a and 902b are configurable to hold weights in place, as desired. Latches 902a are shown in an extended state to support storage weights 904a and 904b. According to one embodiment, in the extended state, the latches are configured to selectively engage one or more end surfaces such as, but not limited to, bottom surfaces of the weights. According to another embodiment, the latches are configured to selectively engage and extend into one or more recesses (such as, but not limited to, notches) on the weights. Latches 902b are shown in a retracted state. However, the latches 902b are extendable to receive a next weight that is raised to the higher elevation. According to one embodiment, in the retracted state, the latches are configured to retract to positions that disengage the latches from the weights, such as, but not limited to, positions within recesses (such as, but not limited to, notches) on the frame 901.

As previously described, the latches are controllable to extend from and retract into the frame. According to one embodiment, the latches have actuators that are controllable to selectively extend and retract the latches. In a further embodiment, the actuators are manually controllable via, for example, levers or switches that are capable of being manually operated from a location accessible to a human operator.

According to another further embodiment, the actuators are electronically controllable. The actuators are in communication with electronic circuitry via, for example, one or more conductive or wireless links. Examples of electrically conductive links include, but are not limited to, electrical wires or cables. The control of the actuators by the electronic circuitry may be based on hardware and/or software. For example, sensor devices detecting the presence of a weight at a certain position may trigger the actuator to extend the corresponding latch(es) from the retracted position (see, for example, latch 902b of FIG. 9) to the extended position (see, for example, latch 902a of FIG. 9). As another example, a software routine detecting the demand for additional power at a certain time may trigger the actuator to retract the corresponding latch(es) from the extended position to the retracted position such that the latched weight is freed from the rack.

Other control routines for controlling the timing of latch extending or retracting operations (for selectively holding or releasing weights) may be provided, by suitable hardware and/or software and suitable processing electronics for processing the routines and providing control signals to latch actuators. Such control routines can be based, at least in part, on the detection of the presence of a weight or the detection of a demand for additional power (e.g., a demand exceeding a specified threshold value) and/or other factors including, but not limited to, preset times of day, dates, environmental conditions, or manual input.

While the embodiment in FIG. 9 shows latches on one or more walls of the frame 901 and recesses or catch surfaces on the weights 904a-b, in other embodiments, the retractable/protruding latches can be located on the weights, and the receptacles can be positioned on the frame or rack. In yet other embodiments, the latches may be pivoting members, as will be described in more detail below with respect to FIG. 15.

Figure 10A:
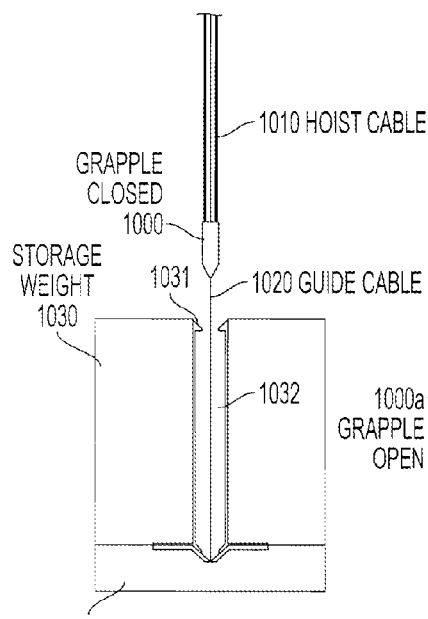
FIGS. 10A, 10B and 10C illustration an operation of a grapple according to one embodiment.
Figure 10B:
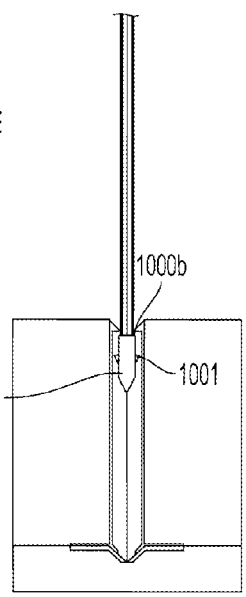
Figure 10C:
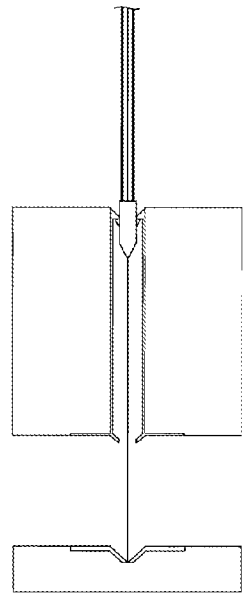

According to one embodiment, to store (or release) energy, the hoist assembly 701 raises (or lowers) the storage weights, one at a time, to position the weights at the top (or the bottom) of the shaft. With reference to FIGS. 10A, 10B and 10C, an example of a grapple interface is described in more detail. The grapple 1000 is positioned at the end of movable hoist cable 1010. The grapple has a central body 1000a and one or more protruding members 1000b. The grapple may also have an inner channel through which a connector, such as, but not limited to, a cable or wire, may extend. In one embodiment, the protruding members 1000b are pivotally coupled to the central body 1000a. In a further embodiment, the protruding members are pivotal between a first position (an open state) at which a portion of the member extends laterally beyond the width of the central body and a second position (a closed state) at which the member is aligned within (or within) the borders of the central body.

The grapple 1000 is controllable to be placed in the closed state or the open state. According to one embodiment, the grapple is controlled to toggle between these two states in a manner similar to the manner in which the latches 902 of FIG. 9 are controlled, as described with reference to FIG. 9. For example, the protruding members 1000b may have actuators that are controllable to selectively pivot the protruding members. In a further embodiment, the actuators are manually controllable via, for example, a levers or a switch that is capable of being manually operated.

According to further embodiments, the actuators are electronically controllable. The actuators are in communication with electronic circuitry via, for example, one or more conductive or wireless links. Examples of electrically conductive links include, but are not limited to, electrical wires or cables. The control of the actuators by the electronic circuitry may be based on hardware and/or software. For example, sensor devices detecting the presence of a weight around the central body 1000a may trigger the actuator to pivot the protruding member from the closed position (see, for example, FIG. 10A) to the open position (see, for example, FIG. 10B). As another example, a software routine detecting the demand for additional power at a certain time and the presence of a weight around the central body 1000a may trigger the actuator to pivot the protruding member from the closed position to the open position such that the engaged weight may be lowered. According to one embodiment, the controlling of the protruding member of the grapple is coordinated with the controlling of the latches (e.g., latches 902 of FIG. 9) that lock the position of the weights, for example, such that the grapple is configured to be in the open position before the latches that engage a certain weight are retracted to free the weight.

As described previously with reference to latches 902 of FIG. 9, other control routines for controlling the timing of grapple opening and closing (for selectively holding or releasing weights) may be provided by suitable hardware and/or software and suitable processing electronics for processing the routines and providing control signals to grapple actuators.

A guide link 1020 extends through a channel in the grapple 1000 and at least a portion of hoist cable 1010. In embodiments of the invention, the guide link 1020 may include, but is not limited to, a guide cable, a guide wire or a guide pipe. The position of the guide link 1020 may be stably fixed, for example, by securing one end of the guide link to a fixed member (e.g., base 1040 of FIG. 10A). For ease of description, the guide link 1020 will be referred to as a guide cable.

With reference to FIG. 10A, the engagement of the grapple with a weight 1030 that is to be raised is shown. In FIG. 10A, the grapple 1000 is in its closed state, and the weight 1030 is resting on base 1040. Guided by the guide cable 1020, the closed grapple 1000 and the hoist cable 1010 may be lowered past the grapple receptacle 1031 of the storage weight 1030. Because the grapple 1000 is in its closed state, it may be extended past the grapple receptacle 1031 and into the channel 1032 of the weight 1030.

With reference to FIG. 10B, the grapple 1000 is shown in its open state. In this state, protrusions 1001 extend from the body of grapple 1000. The protrusions 1001 are configured to engage the grapple receptacle 1031 of the weight 1030. As such, when the open grapple 1000 and the hoist cable 1010 are raised along the channel 1032, the protrusions 1001 engage the grapple receptacle 1031, and the weight 1030 is capable of being lifted by the hoist cable 1010 (see, for example, FIG. 10C). The lifting of the weight is guided by the guide cable 1020. The guide cable 1020 ensures that the storage weights are properly aligned with the base 1040 (during lowering of the storage weights) and also directs the raising of the weights to the storage rack (e.g., rack 900 of FIG. 9). For example, the guide cable 1020 may enable grapple 1000 to quickly re-engage storage weight 1030 when it is desired that storage weight 1030 be raised and returned to the rack (e.g., rack 900 of FIG. 9).

As such, grapple 1000 may be used to individually raise weights along the shaft. In a similar manner, the grapple can individually engage the weights (e.g., via grapple receptacle 1001) such that the weights can be individually lowered along the shaft. For example, at the higher elevation, the closed grapple is lowered past a grapple receptacle of a selected weight and is placed in the open state to engage the grapple receptacle. When the weight is released from the rack (e.g., the latches supporting the weight are retracted into the rack), the lowering of the hoist cable and the grapple will lower the weight along the shaft. When the weight reaches the bottom of the shaft, the grapple 1000 is put in its closed state to disengage from the weight. The hoist cable 1010 and the grapple 1000 may then be raised to retrieve another weight.

Distributing the mass of one weight over multiple weights may reduce the strain imposed on devices such as the hoist and the hoist cable. Weights of slightly more than 100 tonnes each, when lowered at a rate of 10 meters per second, may provide 10 megawatts of output power. Using more than one system (e.g., the system described with reference to FIG. 7) in cooperation (or tandem) with each other can aid in providing a more even level of output power or a more even level of storage availability with respect to time.

According to one embodiment, a friction drive hoist system 110 is employed to raise and lower the weights in a system employing multiple weights. With reference to FIG. 11A, hoist pulley 1101 is operatively coupled with hoist pulleys 1102 and 1103. Pulley 1108 is also operatively coupled with hoist pulleys 1102 and 1103. Hoist pulleys 1102 and 1103 are operative to raise and lower a respective set of weights along tracks 1104 and 1105. For raising the weights, one or more of the pulleys may be operatively coupled to a drive source (such as, but not limited to, a motor) to receive a drive force for raising the weight. For example, hoist pulley 1101 may be operatively coupled with such a drive source. With reference to FIG. 11B, the drums of hoist pulleys 1102 and 1103 rotate in counter directions to raise grapples 1106 and 1107. According to one embodiment, the hoist system 110 uses grapples for example (but not limited to) grapples similar to grapple 1000, which was described with reference to FIGS. 10A, 10B and 10C. For example, when grapple 1106 is engaged with a weight for lowering the weight from the top of the shaft to the bottom of the shaft, the drum of hoist pulley 1103 is caused to rotate in a clockwise direction. Concurrently, the drum of hoist pulley 1102 is caused to rotate in a counter-clockwise direction, thereby raising grapple 1107 towards the top of the shaft.

The manipulation of two grapples 1106 and 1107 by a single cable loop 1109 may render the hoist system 110 more efficient. For example, when one grapple (e.g., grapple 1106) is carrying a weight from the top of the shaft to the bottom, the other grapple (e.g., grapple 1107) will be rising, empty, from the bottom of the shaft to the top. The first grapple releases its weight (e.g., on base 1110), and the second grapple engages a weight and transports it to the bottom of the shaft, and so on. Although only four weights are shown in FIG. 11A, other embodiments of the system may accommodate less or more than four weights. With reference to FIG. 11C, a cross-sectional view of the shaft is shown. Two weights 1109 are positioned for movement along its respective track 1104 and 1105.

According to certain embodiments, systems similar to those described above (e.g., system 20 of FIG. 2) are configured for use in an aquatic environment, such as but not limited to, a large body of water—e.g., an ocean, sea, deep lake or the like.

Figure 12:
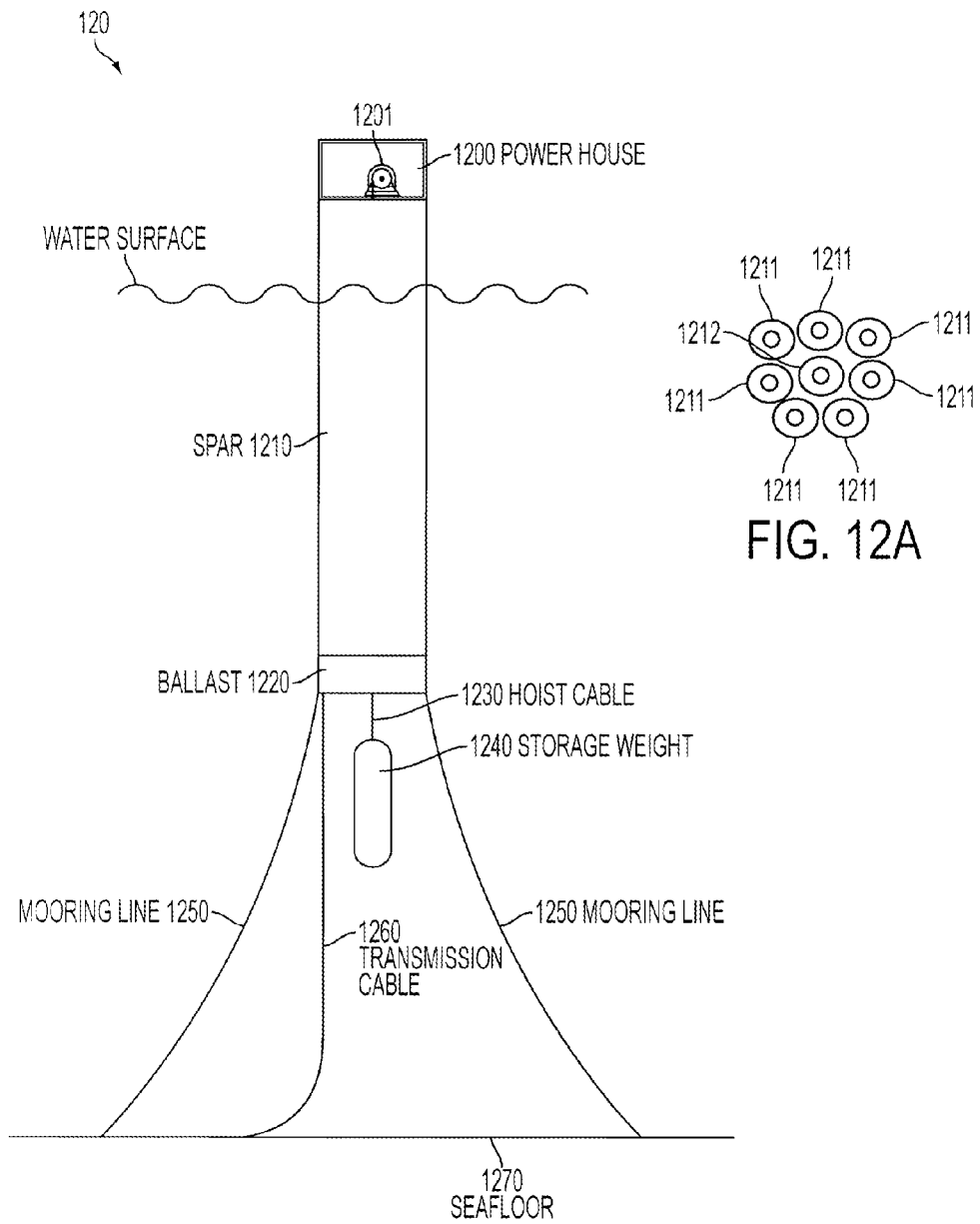
FIG. 12 depicts an energy storage system according to one embodiment.

With reference to FIG. 12, a side view of a sea-based system 120 according to one embodiment is shown. The system includes a buoyant platform 1210. According to an exemplary embodiment, the platform 1210 is formed of one or more cylindrical flotation members (see, for example, the members 1211 of the cross-sectional view of FIG. 12A). According to a further embodiment, the cylindrical members 1211 are generally hollow, water-tight, closed containers that contain a material less dense than water (e.g., air) to increase the buoyancy of the platform 1210. According to a further embodiment, the cylindrical members 1211 contain a material (e.g., low-density foam) to prevent the members from filling with water and sinking in the event of a leak. According to yet another further embodiment, interior structural reinforcement members (e.g., struts) may be positioned inside the cylindrical members to provide additional structural reinforcement.

In other embodiments, the members 1211 may take the form of other shapes, such as, but not limited to, that of polygonal boxes or of spheres.

According to one embodiment, the walls of the cylindrical members are formed of steel or a suitably rigid and/or durable material. A platform formed by cylindrical members such as those described with reference to FIGS. 12 and 12A is known as a "spar" platform. According to alternative embodiments, buoyant platforms may be formed according to other suitable designs.

With continued reference to FIG. 12, the platform 1210 supports a power house 1200, for example, at one end of the platform. As described with respect to earlier embodiments, the power house 1200 may include a hoist 1201, a motor/ generator and other related equipment. A ballast 1220 is positioned, for example, at an opposite end of the platform 1210 relative to the end at which the power house is located. As will be described in more detail below, the ballast 1220 is for positioning the system 120 for operational use.

According to other embodiments, the power house 1200 (e.g., the hoist 1201, motor/generator, and related equipment) may be positioned in the platform (e.g., in a chamber inside the platform) to be closer to the ballast 1220 such that the center of gravity of the system 120 is lowered. As such, the system may be submerged deeper in the body of water, and may be rendered less susceptible to movement due to wind and water currents. For example, according to one embodiment, the power house 1200 may be positioned immediately above the ballast 1220. In an embodiment where the power house 1200 is housed in a chamber in the platform 1210, the chamber may be pressurized and/or sealed to help keep water from entering the chamber.

With reference to FIG. 12A, in the platform 1210, a generally vertical channel or passage 1212 is provided generally at the center of the platform. The channel may be defined by a member such as, but not limited to, a cylindrical member such as a pipe or a shaft. The channel 1212 extends through the platform 1210 to facilitate the raising and lowering of the hoist cable 1230, which is coupled with the hoist 1201.

At one end, the hoist cable (or wire, rope, belt, chain or the like) 1230 is coupled with the hoist 1201. At the opposite end, the hoist cable 1230 coupled with storage weight 1240. As such, the storage weight 1240 is suspended in the water by hoist cable 1230. According to one embodiment, the storage weight 1240 is similar to storage weights described above with respect to other embodiments (e.g., storage weight 303 of FIG. 3). For example, the storage weight 1240 may be constructed of concrete, reinforced concrete, steel, or some suitably dense material.

According to one embodiment, the platform 1210 is moored to the floor 1270 of the body of water to prevent the system 120 from drifting due to wind or water currents. According to one embodiment, the platform 1210 is moored to the floor 1270 via mooring lines 1250. According to one embodiment, the mooring lines may be any suitable connection structure such as, but not limited to, cables, ropes, or chains securable to the floor by stakes, anchors or the like. One or more electric transmission cables 1260 may be provided to transport energy released by the system 120. According to one embodiment, the transmission cables 1260 extend from the power house 1210 to the floor 1270, and from the floor to shore for connection to a power grid (e.g., power grid 204 of FIG. 2).

In operation, the system of FIG. 12 operates similarly to systems described above with respect to other embodiments (e.g., system 300 of FIG. 3). The raising of the storage weight 1240 using hoist 1201 stores energy in the system 120 in the form of gravitational potential energy. The lowering of the storage weight 1240 releases the stored energy, generating power that may be carried by transmission cable 1260.

According to one embodiment, lowering the weight 1240 through water at modest speeds minimizes (or at least reduces) drag losses. For example, a 10-meter diameter concrete sphere may have a mass of 1309 metric tons and, correspondingly, may release over 6.3 megawatt-hours of energy when it is lowered through 3000 meters of water. If the weight is lowered at a speed of 1 meter per second, energy is released at the rate of over 7.5 megawatts over that period. As such, according to a modeled system, it is estimated that drag losses can amount to less than 0.3% of the energy released. A weight having a shape computed to provide better hydrodynamic performance than a sphere (e.g., a capsule-shaped weight with rounded ends such as a weight having the shape of weight 1240) will reduce drag losses further.

As previously described with reference to FIG. 2, a weight of a system may be lowered (or raised) at two or more different speeds. As described above with reference to FIG. 3, in one embodiment, with reference to FIG. 12, a speed at which the weight 1240 is raised by hoist 1201 is controlled electronically. For example, according to one embodiment, a motor/generator for driving hoist 1201 is controlled by a control circuit coupled with the motor/generator to control the rate at which hoist cable 1230 is drawn in by hoist 1201. According to another embodiment, such a control circuit may be coupled with the hoist 1201 to control such a rate.

With continued reference to FIG. 12, in one embodiment, a speed at which the weight 1240 is lowered by hoist 1201 is controlled by configuring an operating frequency of a generator (e.g., generator 200 of FIG. 2) coupled with the hoist. Configuring the operating frequency to be of a certain value correspondingly sets the speed at which the weight 1240 is lowered. Alternatively, if such a generator is synchronous with a power grid (e.g., power grid 204 of FIG. 2), the gear ratio of a gearbox may be configured to control the speed at which the weight 1240 is lowered. For example, according to one embodiment, a gearbox may be coupled between the hoist 1201 and the generator (see, for example, FIG. 21). Configuring the gear ratio of such a gearbox to be of a certain value correspondingly sets the speed at which the weight 1240 is lowered.

With continued reference to FIG. 12, in an alternative embodiment, a speed at which the weight 1240 is lowered by hoist 1201 is controlled by or using a mechanical structure. For example, according to one embodiment, a dampening structure (providing, for example, one or more levels of dampening) is provided to control the rate at which hoist cable 1230 is drawn out from hoist 1201. Such a dampening structure may include, but is not limited to, an adjustable clamp configurable to increase the rotation resistance of the drum of hoist 1201. According to another embodiment, the hoist 1201 includes a structure for setting such a resistance (such as, but not limited, a screw that may be tightened or loosened). The dampening structure described above may be operable manually (e.g., from a location accessible to a human operator) or by an electronically controllable device such as an actuator.

Figure 13:
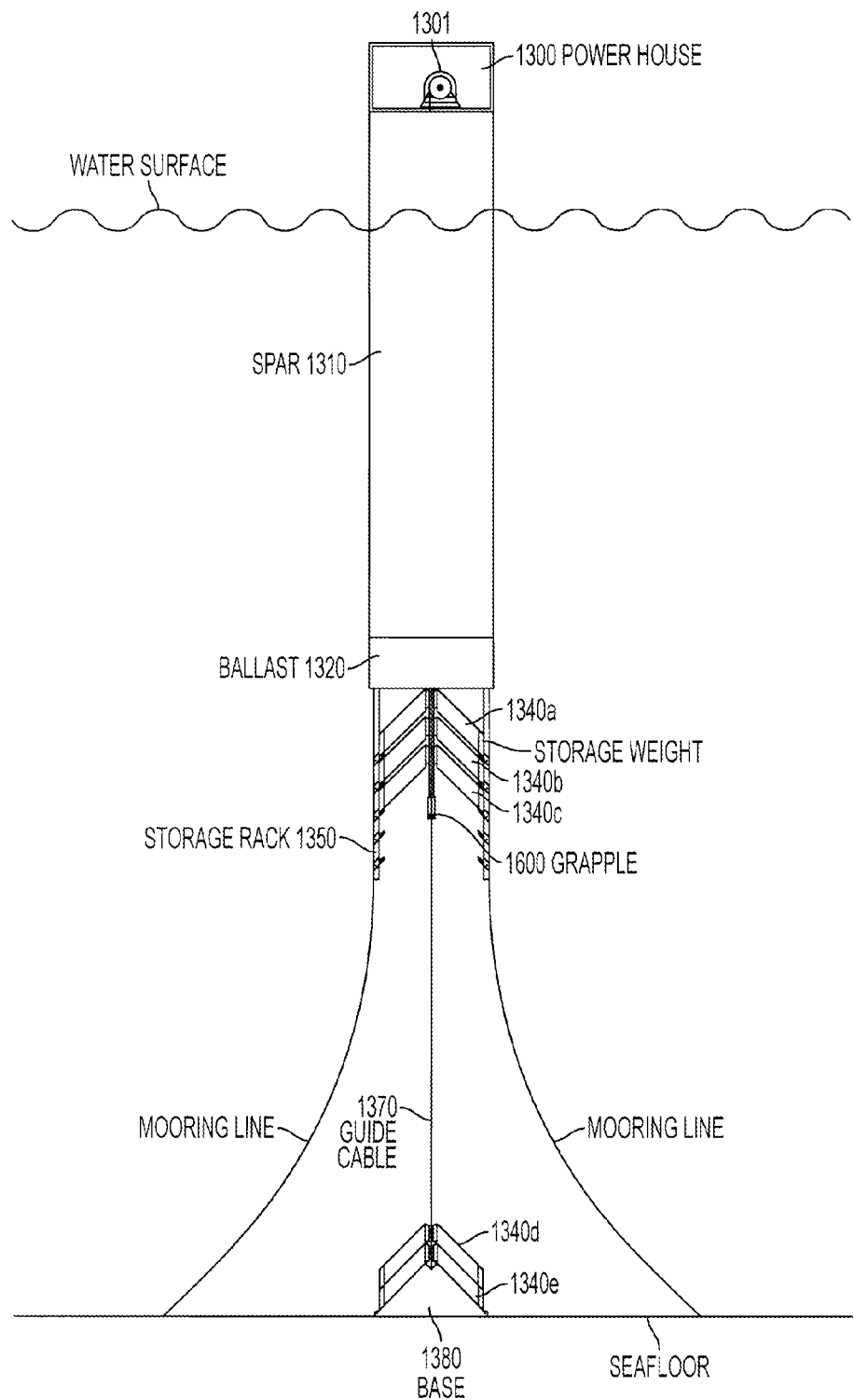
FIG. 13 depicts an energy storage system according to one embodiment.

Similar to the system of FIG. 7, a sea-based system according to one embodiment may employ two or more storage weights. With reference to FIG. 13, the system 130 includes weights 1340*a*, 1340*b*, 1340*c*, 1340*d*, and 1340*e*. Similar to the system of FIG. 7, the weights 1340*a* to 1340*e* may be individually raised and lowered. When raised, the weights may be supported by a rack 1350 suspended from the platform 1310. According to one embodiment, the rack 1350 is similar to racks such as rack 900, which was described with reference to FIG. 9. To release energy, the hoist 1301 lowers the storage weights, one at a time, and rests them on a base 1380 placed on the floor of the body of water. As will be described in more detail with respect to FIG. 15, according to one embodiment, the weights may be supported by storage rack 1350 using latches. As will be described in more detail with respect to FIG. 16, according to one embodiment, a grapple 1600 is used to engage each storage weight 1340*a*, 1340*b*, 1340*c*, 1340*d*, 1340*e* for raising and lowering the weight through the water.

According to one embodiment, a guide cable 1370 (which may be similar, for example, to guide cable 1020 of FIGS. 10A, 10B and 10C) may help to ensure that the storage weights 1340*a* to 1340*e* are properly aligned with the rest base 1380 and enables the grapple 1600 to quickly re-engage with a weight to return the weight to the rack 1350. According to one embodiment, two or more systems such as the system of FIG. 13 are used in cooperation (or in tandem) to provide a more even level of output power and/or a more even level of storage availability.

Figure 14A:
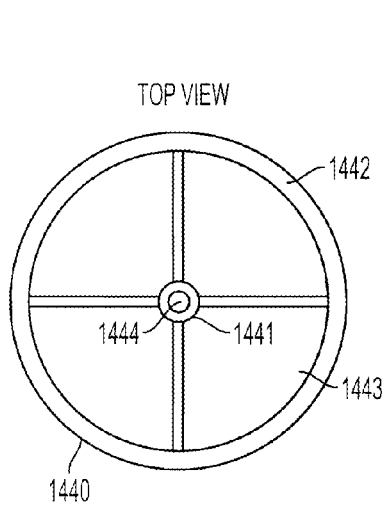
FIGS. 14A and 14B respectively show a top view and a side view of storage weights according to one embodiment.

With reference to FIG. 14A, a top view of a storage weight 1440 according to one embodiment is shown. According to one embodiment, the weight 1440 is configured for improved underwater performance. Grapple receptacle 1441 is provided to engage with the grapple (e.g., grapple 1600 of FIG. 13). In addition, the grapple receptacle 1441 defines (at least in part) the channel 1444 through which the grapple (e.g., grapple 1600 of FIG. 13), the hoist cable, and the guide cable (e.g., cable 1370 of FIG. 13) may extend. The weight 1440 may be shaped such that most (or much) of its mass in located at its periphery. In an embodiment where the weight has a circular cross-section, most (or much) of its weight is located at its rim 1442. As such, the weight is better suited to decrease drag. In other embodiments, the peripheral portion of the weight 1440 may have other suitable shapes. According to one embodiment, the density of the material forming the rim 1442 may be greater than the density of the material forming the interior portion 1443 of the weight. According to another embodiment, the interior portion 1443 is open (or hollow). The rim 1442 (and potentially other portions of the weight) may be constructed of reinforced concrete or a suitably strong material such that the weight is better capable of withstanding water pressure when the weight is submerged significantly below the water surface.

Figure 14B:
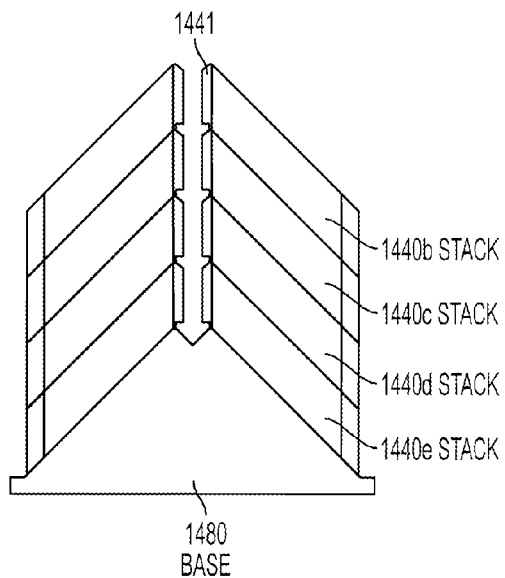

With reference to FIG. 14B, a side cross-sectional view of the weights 1440*b*, 1440*c*, 1440*d* and 1440*e* is shown. According to one embodiment, the weights are configured to rest on base 1480. According to one embodiment, each of the weights is configured such that its center of gravity is located below the grapple receptacle 1441 to improve the stability of the weight as it is lowered or raised through water. According to a further embodiment, the weight 1440 is streamlined to smooth the surface area of its outer surfaces (such as, but not limited to, the surfaces directly pushing against water when the weight is lowered or raised) to minimize (or reduce) fluid drag.

Figure 15:
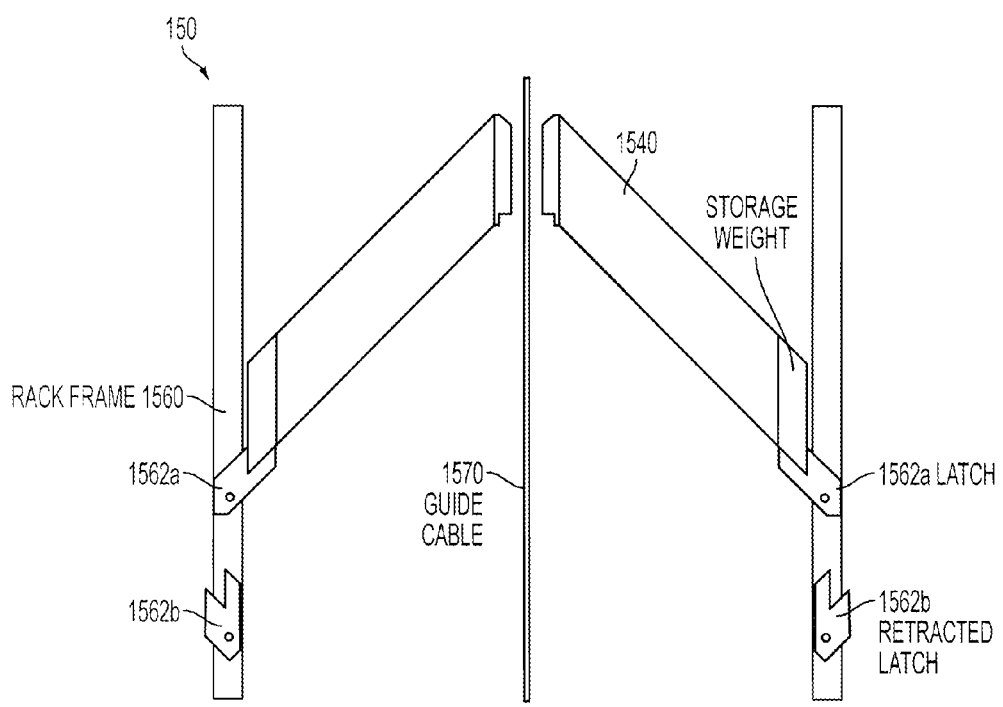
FIG. 15 depicts a storage rack according to one embodiment.

An embodiment of the storage rack is shown in FIG. 15. According to one embodiment, the rack 150 has a frame 1560 that is configured to provide one or more walls adjacent opposite ends of each of the weights. The frame 1560 may include retractable (or pivotable) latches 1562 (e.g., latches 1562*a* and 902*b*) that are controllable to extend (or pivot) from and retract into (or pivot back to) the frame 1560.

In one embodiment, the latches 1562 are pivotally coupled to the frame. In a further embodiment, the latches are pivotal between a first position (an extended state) at which a portion of the latch extends laterally beyond the width of the frame and a second position (a refracted state) at which the latch is generally aligned with or within the borders of the frame.

The latches are controllable to be placed in the extended state or the retracted state. According to one embodiment, the control of the latches is similar to that described with respect to latches 902 of FIG. 9. For example, the latches 1562 may have actuators that are controllable to selectively pivot the latch. In a further embodiment, the actuators are manually controllable via, for example, a levers or a switch that is capable of being manually operated, for example, as described above with respect to FIG. 9. According to another further embodiment, the actuators are electronically controllable in a manner similar to the electronic control of the actuators of latches 902 of FIG. 9.

The latches 1562*a* and 1562*b* are configured to support weights on the storage rack 150. Latches 1562*a* are shown in an extended state to support storage weight 1540. According to one embodiment, in the extended state, the latches engage a surface feature (such as, but not limited to, a bottom surface) of the weight. Latches 1562*b* are shown in a retracted state. However, the latches 1562*b* are extendable to support a next weight that is raised.

According to another embodiment, the latches 1562 are configured to extend from and retract into frame 1560, similar to the configuration of latches 902, which were described with reference to FIG. 9.

The operation of grapple 1600 is now described in more detail with reference to FIGS. 16A, 16B and 16C. In one embodiment, the grapple 1600 is similar to grapple 1000, which was described with reference to FIGS. 10A, 10B and 10C. For example, similar to the grapple 1000, the grapple 1600 has a central body 1600*a* and one or more protruding members 1600*b*. Further, the grapple 1600 may also have an inner channel through which a connector such as, but not limited to, a cable or wire may extend. Further, in one embodiment, the protruding members 1600*b* are pivotally coupled to the central body 1600*a*. In a further embodiment, the protruding members are pivotal between a first position (an open state) at which a portion of the member extends laterally beyond the width of the central body and a second position (a closed state) at which the member is generally aligned with or within the borders of the central body.

According to one embodiment, the operation of the grapple 1600 is similar to the operation previously described with reference to grapple 1000 of FIGS. 10A, 10B and 10C. The grapple 1600 may be positioned at the end of hoist cable 1661. The grapple 1600 is configurable to be placed in a closed state or an open state in a manner similar to that described with respect to grapple 1000 of FIGS. 10A, 10B and 10C. In addition, in one embodiment, the control of the state of the grapple 1600 and the control of the state of the latches (e.g., latches 1562 of FIG. 15) are coordinated in a manner similar to that described with respect to latches 902 and grapple 1000. Guide cable 1670 extends through a channel in the grapple 1600 and at least a portion of hoist cable 1661. The position of the guide cable 1670 may be stably fixed by securing one end of the guide cable to base 1680.

Figure 16C:
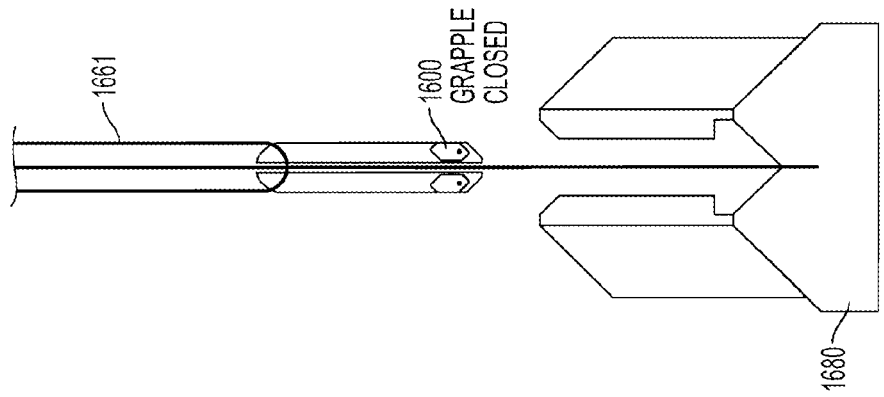
FIGS. 16A, 16B and 16C illustration an operation of a grapple according to one embodiment.
Figure 16B:
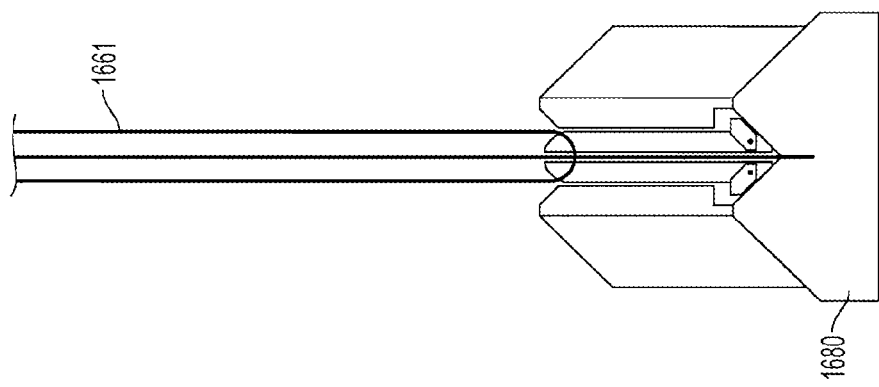
Figure 16A:
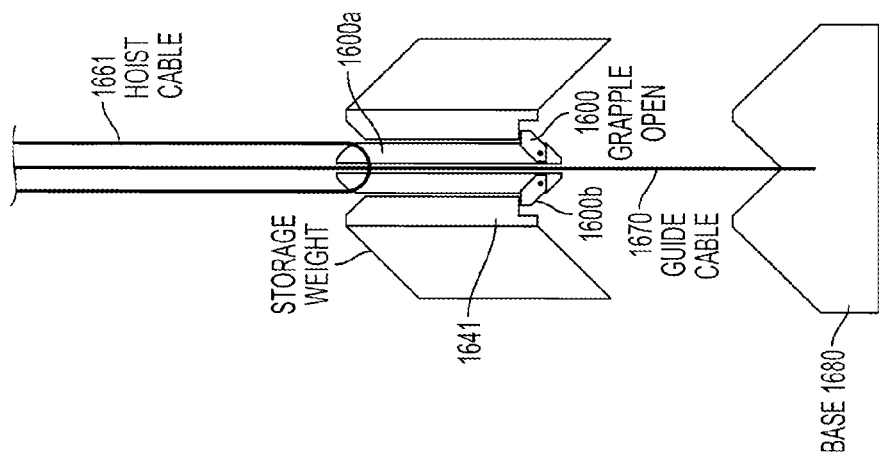

With reference to FIG. 16A, the engagement of a weight that is being lowered is shown. The grapple 1600 is in its open state. In this state, protrusions 1601 extend from the body of grapple 1600. The protrusions 1601 are configured to engage the grapple receptacle 1641 of the weight 1640. As such, when the grapple 1600 is opened, the protrusions 1601 engage the grapple receptacle 1641, and the weight 1640 may be lowered with the hoist cable 1661. The lowering of the weight 1640 is guided by the guide cable 1670. The guide cable 1670 may ensure that the storage weight is properly aligned with the rest base 1680 and also may enable the grapple 1600 to more quickly re-engage with the weight when it is desired that the weight be returned to the rack (e.g., rack 15 of FIG. 15). With reference to FIG. 16B, the weight 1640 is lowered to rest on base 1680.

With reference to FIG. 16C, the grapple 1600 is configured to release the weight 1640 so that the grapple 1600 and hoist cable 1661 can be raised to retrieve a next weight. The grapple 1600 is in a closed position. Because the grapple 1000 is in its closed state, it may disengage with the grapple receptacle 1641 of the weight 1640. As such, the grapple 1600 and the hoist cable 1661 may be raised to leave the weight 1640 remaining at its rest position (e.g., on base 1680).

As such, grapple 1600 may be used to individually lower weights through water. It is understood that, in a similar manner, the grapple may be used to individually raise weights through the water. As previously described with respect to FIG. 15, when a weight is raised to the storage rack, it may be supported by the rack (e.g., using the latches shown in FIG. 15).

According to one embodiment, a system (e.g., the system of FIG. 13) may be configured to by powered by renewable energy as well as more conventional sources such as hydrocarbons to raise weights at desired times.

Figure 17:
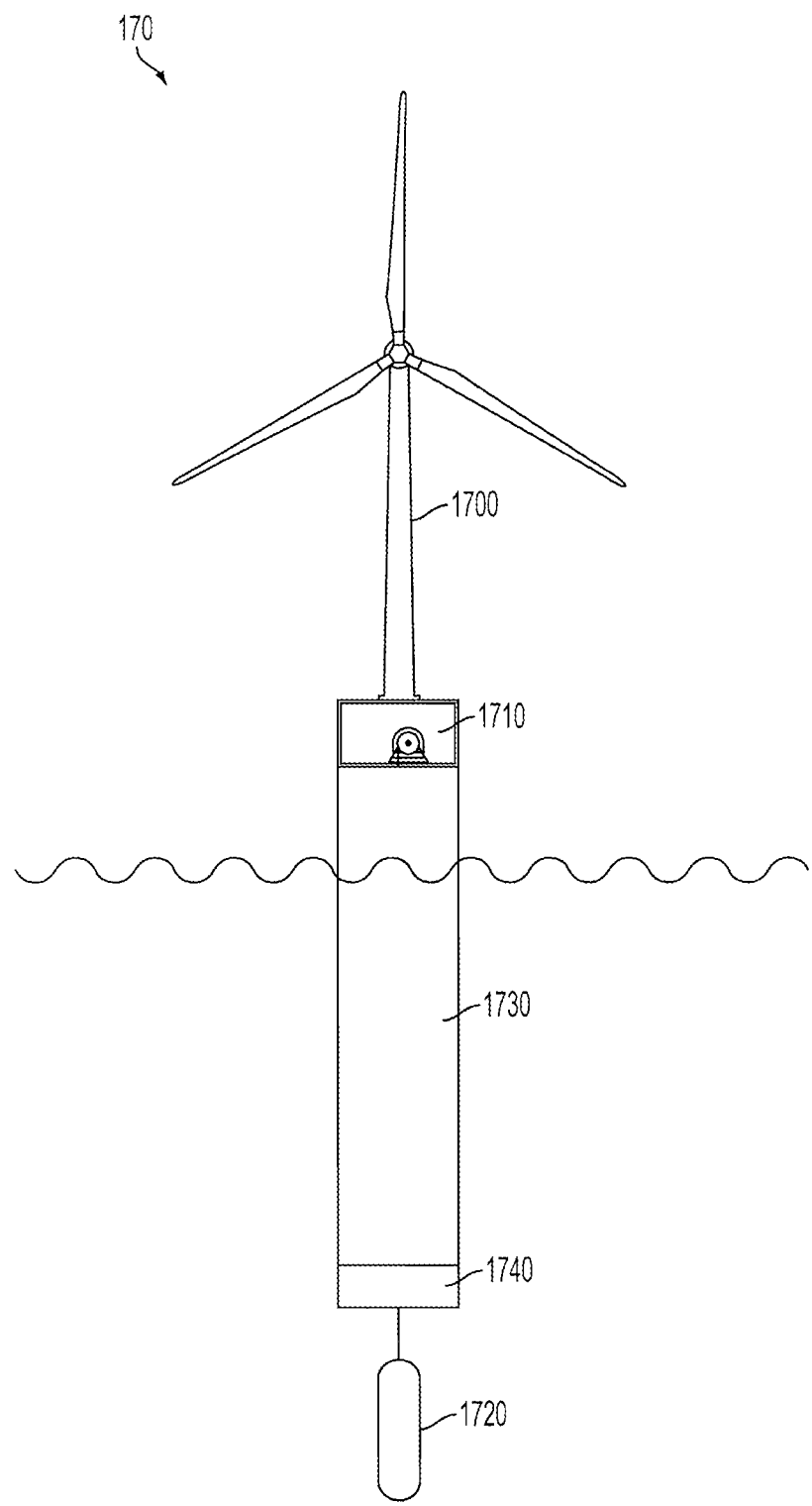
FIG. 17 depicts an energy storage system according to one embodiment.

With reference to FIG. 17, a system 170 may include a wind turbine energy generator 1700. The generator 1700 is for generating energy for driving the hoist 1720 to raise weight 1720 through the water. As such, wind energy captured by the wind turbine energy generator 1700 may be stored in the system 170 as gravitational potential energy. The stored energy may be released at a later time (e.g., when demand for power is greater).

Oceanic sites, including sites located relatively distant from land, can be appropriate for a wind turbine such as wind turbine 1700. If the site is located relatively distant from land, the wind turbine may be beyond visible and/or audible range from land. Therefore, observers on land likely will tend not to view the turbine as an "eyesore" and/or as a significant source of noise pollution. Further, sites can be chosen to be located away from known or likely routes used by migrating birds. Therefore, it is less likely that the operation of the turbine will affect wildlife. Such sites can be selected for minimizing environmental impact.

Furthermore, because the system of FIG. 17 provides a surface (e.g., a surface of the platform structure 1730 such as a surface of the powerhouse 1710) for supporting the turbine 1700, a separate platform for supporting the wind turbine is not required, thereby reducing the costs typically associated with installing a wind turbine offshore. The platform 1730 may be configured to be sufficiently buoyant to support the weight of the turbine 1700 such that the blades of the turbine remain above water during operation. A ballast 1740 at the bottom of the platform 1730 helps maintain the system 170 in an operational position.

As previously described, at least part of the energy captured by the wind turbine 1700 can be stored and subsequently released at a more suitable time in order to produce a more even level of output power over time. As such, the wind turbine is thereby converted from a relatively intermittent power source that might provide power of only a relatively low value (e.g., power that is captured during off-peak periods) to a dispatchable power source that provides power of a relatively higher value (e.g., power that is provided during peak periods). In other words, wind energy that is captured during periods of low power demand, such as late at night, may be stored in the system. The stored energy may be released (e.g., to a grid) during periods of high power demand, when power is much more valuable.

Figure 18A:
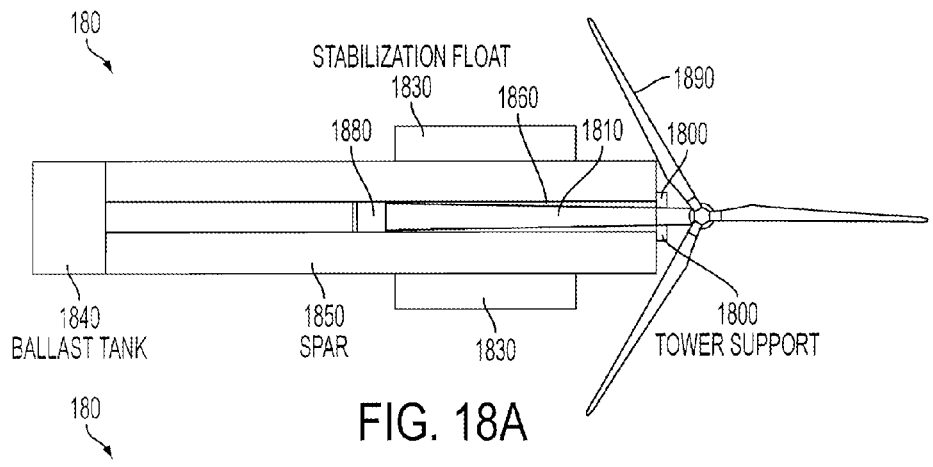
FIGS. 18A and 18B respectively show a top and a side view of an energy storage system according to one embodiment.
Figure 18B:
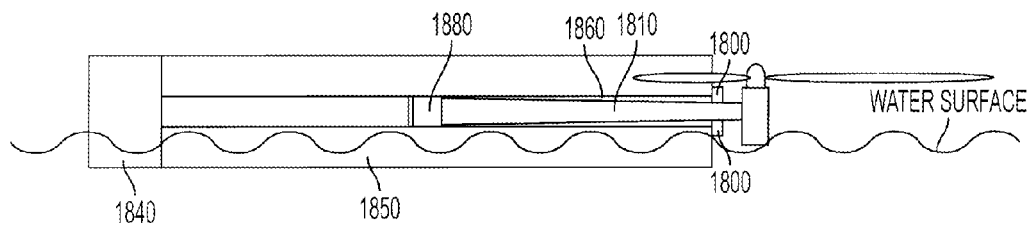

According to one embodiment, a system such as the system of FIG. 17 may be configured for convenient transport and installation at sea. FIGS. 18A and 18B respectively show top and side views of a system according to such an embodiment. As will described in more detail below, the system 180 may be positioned on its side (e.g., in the position illustrated in FIG. 18B) for example, for transportation, storage, or servicing, on land and in dry dock. The system 180 may be configured in a manner such that heavy equipment such as cranes may not be required to move the system.

With reference to FIG. 18, the system 180 includes a spar 1850, flotation devices 1830, a wind turbine 1890 including tower 1810, tower supports 1800, slidable piston 1880 and ballast tank 1840. According to one embodiment, the spar 1850 has a cylinder 1860 sized to receive the tower 1810. According to a further embodiment, the spar 1850 is similar in structure to spar 1210, which was described with reference to FIG. 12. For example, the spar 1850 may include one or more cylindrical flotation members that may be similar to members 1211, which also were described with reference to FIG. 12. Flotation devices 1830 may also be similar to members 1211. The wind turbine 1890 includes blades and tower 1810 which supports the blades of the turbine. According to one embodiment, the flotation devices 1880 are similar in structure to members 1211. The tower supports may include a malleable structure that may be configured to have a shape conforming to an adjacent object (e.g., the tower 1810).

According to one embodiment, the system 180 is configured in a manner such that the wind turbine tower 1810 is retracted into a cylinder (e.g., a central cylinder) 1860 of the spar 1850. One end of the tower 1810 is coupled with a slidable piston 1880. In one embodiment, tower supports 1800 may be removably provided at the entrance to the cylinder 1860 to support the tower 1810 (e.g., to minimize wobbling during transport). In one embodiment, a ballast tank 1840 is located at the opposite end of the spar 1850. In a further embodiment, stabilization floats 1830 are removably attached to each side of the spar 1850 to stabilize the platform during transport. With continued reference to FIG. 18A, the illustrated system is ready to be transported (e.g., towed) to an installation site (e.g., an installation site located offshore).

With reference to FIG. 18B, the illustrated system is at the aquatic installation site and ready to be installed at the site.

Figures 19A, 19B, 19C:
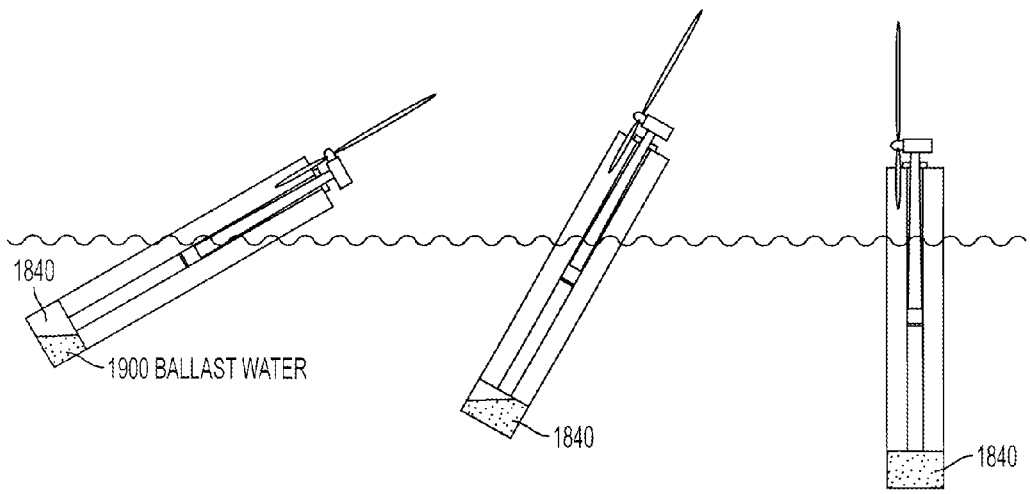
FIGS. 19A, 19B and 19C illustrate an installation of an energy storage system according to one embodiment.

A procedure to install the platform for operation will now be described with reference to FIGS. 19A, 19B and 19C. With reference to FIG. 19A, the ballast tank 1840 may be configured to take in water 1900. As the ballast tank 1840 continues to take in water, the center of gravity of the spar 1850 changes accordingly. The change in the center of gravity causes the ballasted end of the spar 1850 to sink deeper into the water (see, for example, FIGS. 19A and 19B). The ballast tank 1840 is configured to take in a sufficient amount of water such that the equilibrium position of the spar is a standing position (see, for example, FIG. 19C). When the spar 1850 stands upright, as shown in FIG. 19C, it may then be positioned in the desired location and then moored to the floor of the body of water so that its position is fixed. One or more storage weights may be coupled for operation with the system such that gravitational potential energy may be stored in the system. For example, one or more storage weights may be coupled according to a configuration similar to that illustrated in FIG. 17.

Figures 20A, 20B, 20C:
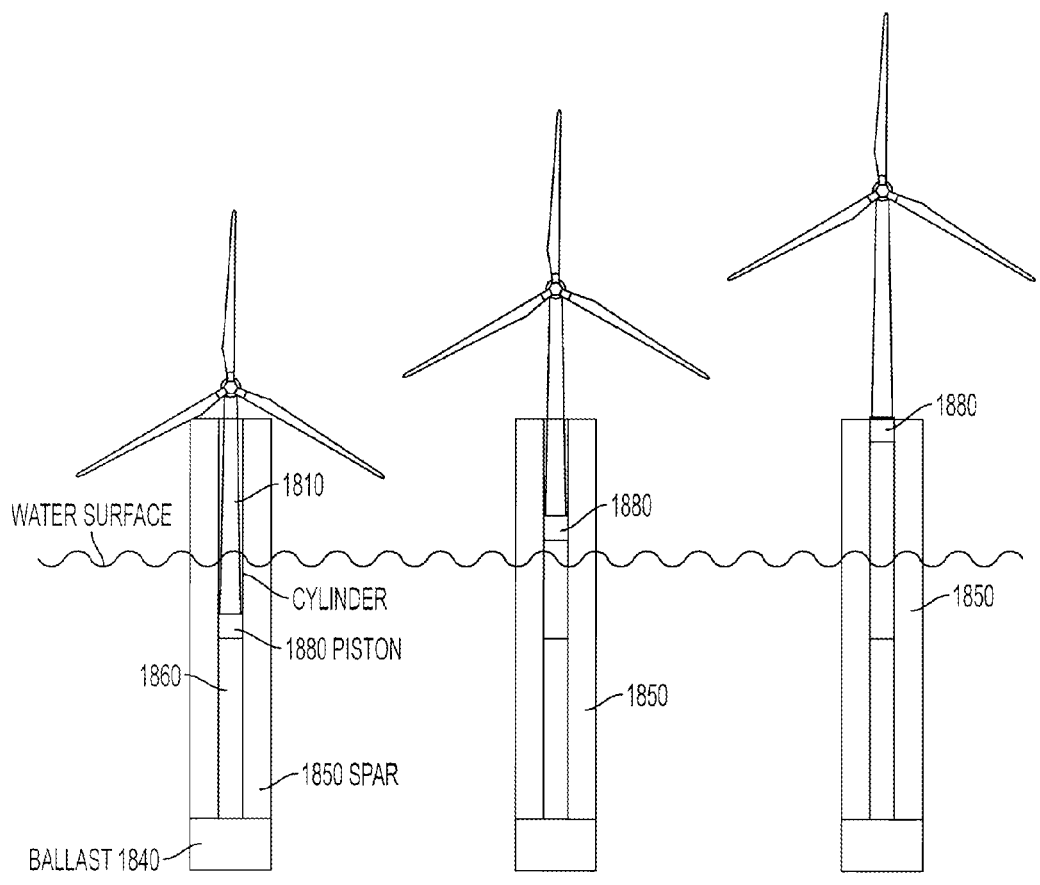
FIGS. 20A, 20B and 20C illustrate an installation of an energy storage system according to one embodiment.

The procedure to install the platform for operation will now be further described with reference to FIGS. 20A, 20B and 20C. As previously described, the tower 1810 is positioned in a cylinder 1860 in the center of the spar 1850, and the lower end of tower 1810 is coupled with a slidable piston 1880. The piston 1880 is caused to slide upward, thereby pushing the tower 1810 in an upward direction (see, for example, FIGS. 20B and 20C). According to one embodiment, the piston 1880 is caused to slide upward when air is pumped into the cylinder 1860, at the location below the piston 1880 (between the piston 1880 and the ballast tank 1840). A suitable air inlet port (not shown) may be provided on the spar for connection to a pressurized air source (not shown). The sliding of the piston 1880 may be continued until the tower 1810 reaches its fully extended position. The air inlet may be sealed after the piston 1880 is slid into its extended position. According to one embodiment, the tower 1810 reaches its fully extended position when the piston 1880 reaches the end of the spar 1850 (see, for example, FIG. 20C). The tower 1810 may be bolted or otherwise suitably fastened in place.

Under known techniques, a wind turbine tower, which can be over 100 meters tall, requires extremely tall and expensive cranes to raise the tower and hoist the nacelle and turbine blades of the tower. This would be especially difficult and expensive in deep ocean water, where the waves can be large and the winds can be strong. In contrast, the procedure described with reference to FIGS. 19A, 19B, 19C, 20A, 20B and 20C may not require such equipment, thereby saving both time and expense. Furthermore, certain steps in the procedure may be reversible. For example, the tower 1810 may be lowered (e.g., retracted) back into the cylinder 1860—e.g., to place the nacelle closer to the water where replacement of faulty components can be accomplished more easily.

As previously described, wind turbines with energy storage systems, such as those disclosed herein with reference to certain embodiments, may provide significant cost savings. Wind power can be used to turn a rotor in a motor/generator to generate electrical power to be used to raise one or more weights. Alternatively, with reference to FIG. 21, a wind turbine 2110 is directly mechanically coupled with a shaft storage system (e.g., a system similar to the storage system of FIG. 13), allowing direct use of wind power to hoist the storage weight 2130 via hoist 2120. That is, the rotation of the rotor of the turbine 2110 causes one or more gears of gearbox 2140 to rotate. The rotation of the gears causes the drum of hoist 2120 to rotate, thereby raising weight 2130. The coupling of a generator between the turbine 2110 and the hoist 2120 may not be required, thereby saving costs and rendering the design of the system 210 more simple and less complex. As previously described, such a system facilitates the release of captured wind energy (e.g., to a power grid) on an as-needed basis, rather than only when the wind blows. As a result, the value of the wind energy may be substantially increased.

Figure 22:
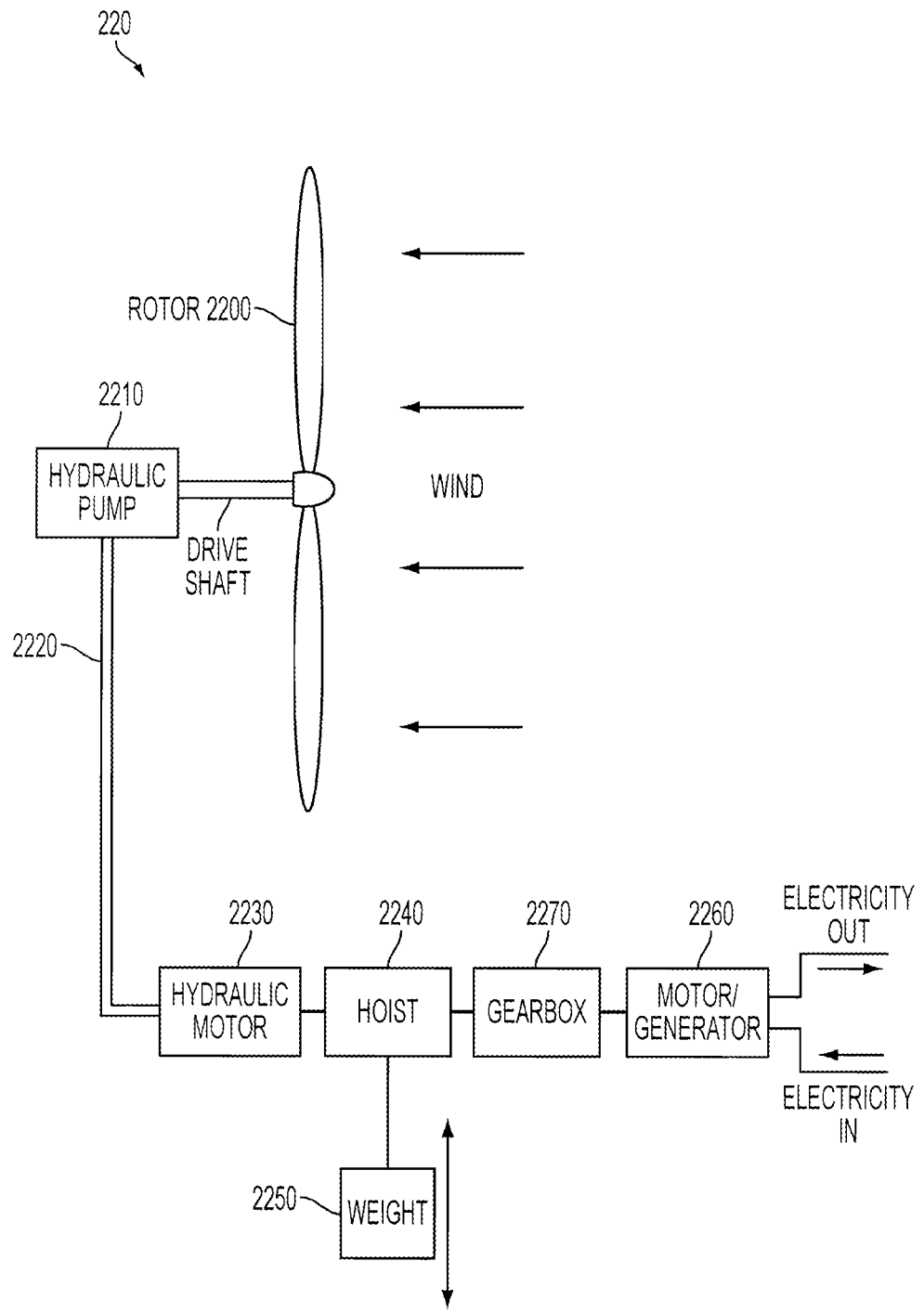
FIG. 22 is a generalized schematic diagram of an energy storage system according to one embodiment.

A schematic representation of a combined system 220 according to another embodiment is shown in FIG. 22. In the system 220, the wind turbine 2200 drives a hydraulic pump 2210, which pumps hydraulic fluid (e.g., high pressure hydraulic fluid) through a pressure hose 2220 to a hydraulic motor 2230. The hydraulic motor 2230 drives hoist 2240 to lift the storage weight 2250. According to one embodiment, when the storage weight 2250 is lowered, the hoist 2240 is rotated to rotate one or more gears of the gearbox 2270. The rotation of the gears is converted to electrical power by generator 2260. According to a further embodiment, two or more hydraulic lines such as pressure hose 2220 may be coupled together to drive hydraulic motor 2230, thereby facilitating the driving of hoist 2240 using the output of more than one wind turbine.

Another embodiment of the invention will now be described with reference to FIGS. 23A and 23B. The system 230 in FIGS. 23A and 23B includes a shaft structure 2320 including, for example, but not limited to, a generally cylindrical pipe made of a suitably rigid material, such as, but not limited to, metal, plastic, a composite material or the like. The pipe has a central channel in which a weight 2310 is supported for movement between a first position (shown in FIG. 23B) and a second position (shown in FIG. 23A). The system 230 also includes a pump 2340, a pipeline 2360 and a motor/generator 2350. According to one embodiment, the pipeline includes, but is not limited to, a tube-like structure made of a suitably rigid material, such as, but not limited to, metal, plastic, a composite material or the like. The weight 2310 is sized to move within the channel of the shaft structure 2320. In one embodiment, the weight is made of a suitably dense material such as, but not limited to, concrete, steel or the like. The pressure seals 2320 are sized to at least span a gap between the weight 2310 and the inner periphery of shaft structure 2320 to form a water-tight seal therebetween. According to one embodiment, the pressure seals are formed of a durable, flexible material such as, but not limited to, plastic, rubber or the like.

The operation of system 2300 is similar to that of the system of FIG. 2 in that the system 2300 also stores gravitational potential energy using a storage weight that is caused to be elevated and lowered. With regards to the embodiment of FIG. 23A, weight 2310 is positioned in the channel of shaft structure 2320 that facilitates the inflow and outflow of a hydraulic fluid. For ease of description, the shaft structure 2320 will be referred to as a storage pipe. According to one embodiment, the hydraulic fluid is water.

Figures 23A, 23B:
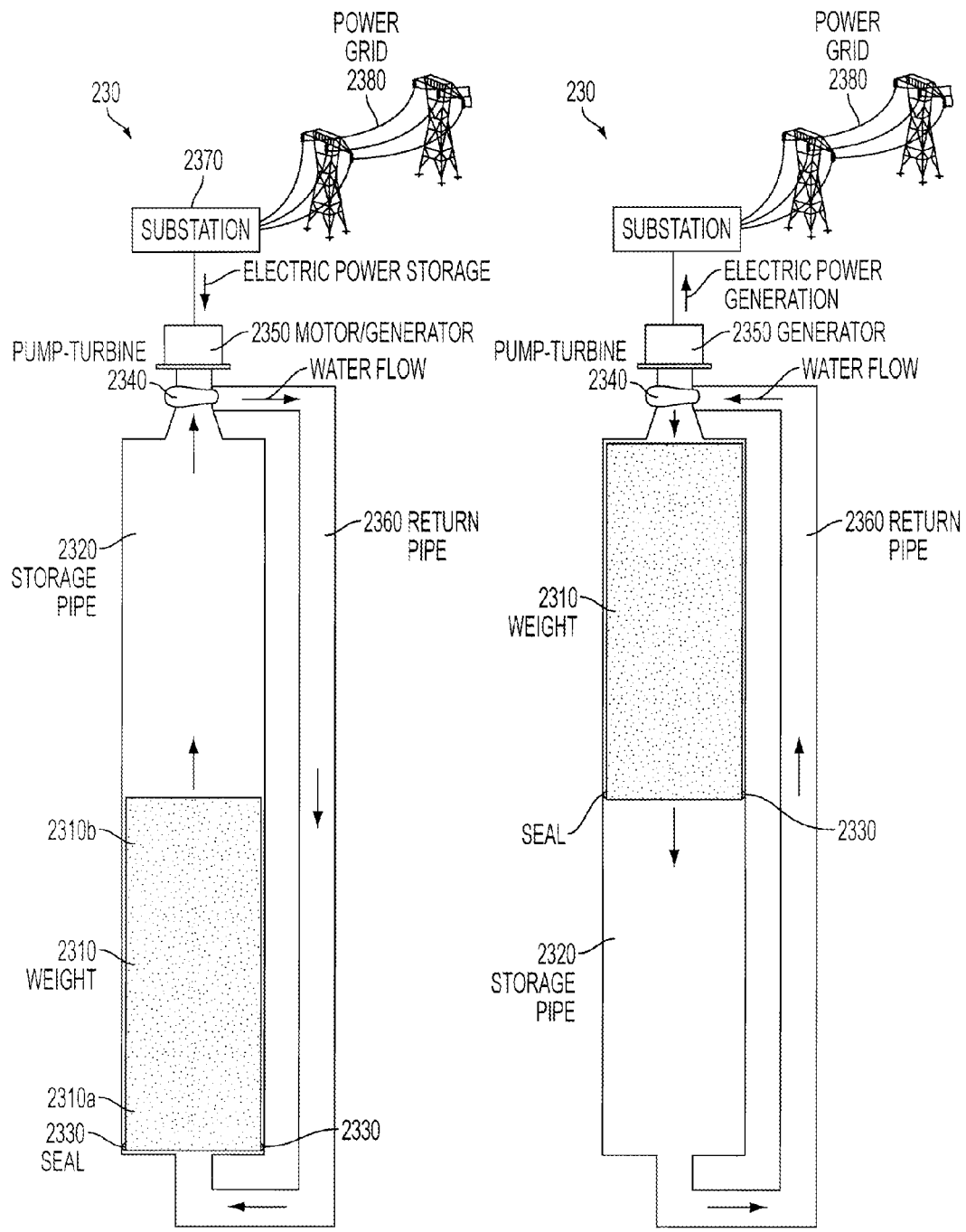
FIGS. 23A and 23B illustrates an operation of an energy storage system according to one embodiment.

With continued reference to FIG. 23A, the weight 2310 is sized to be slidably positioned within the pipe 2320. According to one embodiment, the weight 2310 is sized to narrowly but slidably fit within the confines of pipe 2320. As such, the size of the weight can be maximized to increase the amount of gravitational potential energy that can be captured by the weight, without significantly affecting the freedom of the weight to move within the pipe 2320. According to a further embodiment, a pressure seal 2330 may be provided on the weight 2310 to prevent the hydraulic fluid from flowing past the seal 2330. As shown in FIG. 23A, the seal 2330 is disposed at the lower end 2310*a* of the weight 2310. In other embodiments, the seal 2330 may be disposed at the upper end 2310*b* of the weight 2310, or between the lower end 2310*a* and the upper end 2310*b*.

With continued reference to FIG. 23A, a pump (or pump-turbine) 2340 is connected by pipeline 2360 to the top and bottom of the pipe 2320, and is connected through a driveshaft to an electric motor/generator 2350. As shown in FIG. 23A, the pump 2340 is positioned near the upper end of the pipe 2320. In other embodiments, the pump 2340 is positioned near the lower end of the pipe 2320, or between the upper and lower ends. The motor/generator 2350 is also connected to an external source of electric power, such as the power grid 2380, for example, via substation 2370.

In operation, when electric power is provided by the external source 2380 to the motor/generator 2350, the motor/generator 2350 drives the pump 2340 to increase the pressure of the hydraulic fluid along the direction indicated in the arrows of FIG. 23A in pipeline 2360. As a result, pressure in the fluid below weight 2310 is increased, forcing the weight 2310 to rise toward the upper end of shaft 2320. As such, gravitational potential energy is stored in the system 230 (see, for example, the configuration of FIG. 23B). According to one embodiment, when the weight 2310 reaches an elevated position (such as, but not limited to, the position of FIG. 23B), latches, as described above, valves in pipe 2360 or in pipe 2360, a lock on the pump turbine or another suitable structure are operated to maintain the pressure of the hydraulic fluid supporting the weight 2310. For example, similar to the latches described previously, such structures may be operated manually and/or electronically.

According to other embodiments, air or a gaseous material may be used rather than (or in combination with) a liquid in the shaft 2320 to push weight 2310 in an upwards direction. According to these embodiments, an air compressor may be used in place of (or in addition to) the pump 2340 to increase the pressure of the air, thereby elevating the weight 2310.

The release of energy stored in the system 230 will now be described in more detail with reference to FIG. 23B. In one embodiment, the maintenance structures (e.g., latches, valves, or locks) are operated to release the pressure of the hydraulic fluid supporting the weight 2310. When the weight 2310 is allowed to drop towards the lower end of the shaft 2320, the mass of the weight forces the liquid to flow out through the pipe 2320 and through the pipeline 2360 in the direction of the arrows indicated in FIG. 23B in the pipeline 2360. The flow of the liquid drives the pump 2340, which causes the generator 2350 to produce electric power to be transmitted, for example, to the power grid 2380. In embodiments employing a gaseous substance (such as, but not limited to, air) in place of a liquid, the falling weight 2310 causes the air beneath the weight 2310 and in the pipeline 2360 to pressurize. The pressurized air drives the pump/turbine 2340, which causes the generator 2350 to produce electric energy.

According to an embodiment employing a liquid as the pressurized material, the liquid is selected/configured to reduce operational energy losses that may be incurred in the system. For example, in one embodiment, the composition of the liquid is modified by adding polyethylene-oxide or a similar substance to the liquid (e.g., water) in order to decrease turbulence that may be experienced by the moving weight 2310 and to decrease the amount of friction caused by the sliding of the pressure seal 2330 against the pipe 2320. According to yet another embodiment, a liquid other than water can be used. For example, petroleum may be used because it has a lower density than water. Therefore, the use of petroleum may increase the negative buoyancy and effective storage capacity afforded by weight 2310 on a cubic-meter basis. In addition, the replacement of water with petroleum would decrease the friction caused by the sliding of pressure seal 2330 against the pipe 2320.

As previously described with reference to FIG. 2, a weight of a system may be lowered (or raised) at two or more different speeds. With reference to FIG. 23A, in one embodiment, a speed at which the weight 2310 is raised by the fluid is controlled electronically. For example, according to one embodiment, the motor/generator 2350 for driving pump-turbine 2340 is controlled by a control circuit coupled with the motor/generator to control the level of fluid pressure that is produced. According to another embodiment, such a control circuit may be coupled with the pump-turbine 2340 to control such a rate.

With continued reference to FIG. 23A, in one embodiment, a speed at which the weight 2310 is lowered along pipe 2320 is controlled by configuring an operating frequency of the generator 2350. Configuring the operating frequency to be of a certain value correspondingly sets the speed at which the weight 2310 is lowered. Alternatively, if the generator 2350 is synchronous with the power grid 2380, the gear ratio of a gearbox may be configured to control the speed at which the weight 2310 is lowered. For example, according to one embodiment, a gearbox may be coupled between the pump-turbine 2340 and the generator 2350 (similar to the configuration illustrated in FIG. 21). Configuring the gear ratio of such a gearbox to be of a certain value correspondingly sets the speed at which the weight 2310 is lowered.

With continued reference to FIG. 23A, in an alternative embodiment, a speed at which the weight 2310 is lowered along pipe 2320 is controlled by or using a mechanical structure. For example, according to one embodiment, a dampening structure (providing, for example, one or more levels of dampening) is provided to control the rate at which the fluid is forced out from pipe 2320 and into pipe 2360. Such a dampening structure may include, but is not limited to, a valve controlling such inflow into pipe 2360. According to another embodiment, the pump-turbine includes a structure for setting a rate of inflow from the pipe 2360 and to the pump-turbine. The dampening structure described above may be operable manually (e.g., from a location accessible to a human operator) or by an electronically controllable device such as, but not limited to, a valve actuator.

According to another embodiment (similar to the respective embodiments of FIGS. 7 and 13), multiple weights are utilized. In some instances, pumps (or pump-turbines) such as pump 2340 of FIG. 23A may accommodate only up to a certain level of water pressure or "head." Because the level of water pressure produced by a weight (e.g., the weight 2310 of FIG. 23A) is determined by the density and height of the weight, a sufficiently large and dense weight may potentially produce more water pressure than the pump can comfortably handle. By using multiple weights, each of which is sized to produce a level of water pressure that can be accommodated by the pump, incremental increases in water pressure can be kept within comfortable levels.

In the embodiment illustrated in FIGS. 23A and 23B, one pipe 2320 and one pipe 2360 are shown. In other embodiments, a parallel configuration of two or more pipes similar to pipe 2320 (each having a weight similar to weight 2310 contained therein) may be coupled between pump-turbine 2340 and pipe 2360. In other embodiments, a parallel configuration of two or more pipes similar to pipe 2360 may be coupled between pipe 2320 and pump-turbine 2340. In yet other embodiments, a parallel configuration of two or more pipes similar to pipe 2320 (each having a weight similar to weight 2310 contained therein) may be coupled between pump-turbine 2340 and a parallel configuration of two or more pipes similar to pipe 2360. The operation of the embodiments described in this paragraph may be similar to the operation previously described with reference to FIGS. 23A and 23B.

Figure 24:
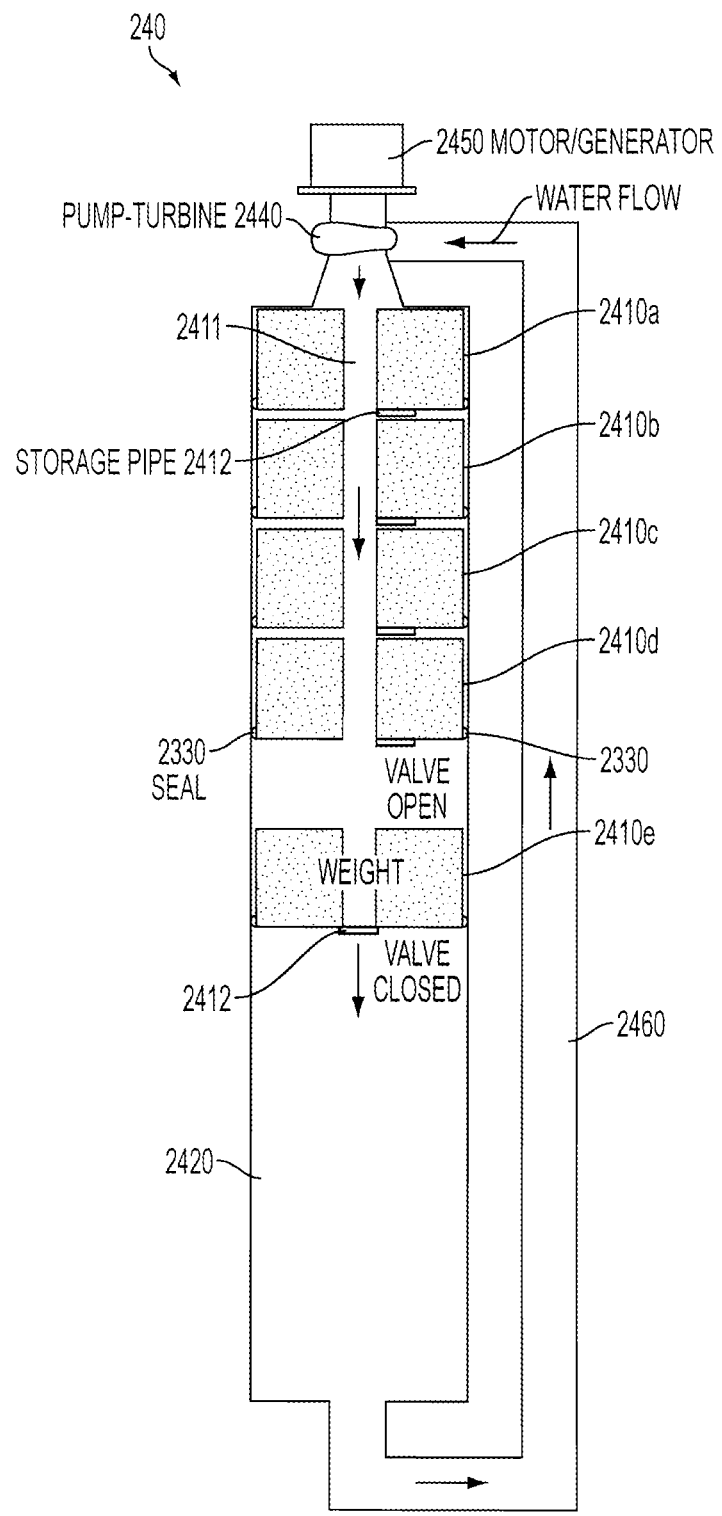
FIG. 24 depicts an energy storage system according to one embodiment.

With reference to FIG. 24, a system employing multiple weights is shown. The system 240 includes motor/generator 2450, pump-turbine 2440, pipe 2420, return pipe 2460, and pressure seals 2330. In one embodiment, one or more of these structures is similar to corresponding structure(s) in the system of FIG. 23. The system 240 also includes a plurality of weights 2410a, 2410b, 2410c, 2410d and 2410e. As described with other weights in this disclosure, the weights 2410a-e may be formed of a suitably dense material (e.g., steel, concrete, or the like). In one embodiment, each of the weights includes a valve 2412. Each of the weights 2410a, 2410b, 2410c, 2410d and 2410e defines an inner channel 2411 through which a liquid substance such as, but not limited to, water may pass. According to one embodiment, the weights 2410a-2410e may be supported by a storage rack (not shown) located at the top of the pipe 2420 and similar to the rack 900 described with reference to FIG. 9. In addition, such a rack may include latches (e.g., latches similar to latches 902, which were described with reference to FIG. 9) that are configurable to hold the weights in place on the rack.

In conjunction with latches similar to the latches 902 of FIG. 9, the valves 2412 are configurable to position the weights, as desired. Valves 2412 of weights 2410a-2410d are shown in an open state. According to one embodiment, in the open state, the valves have been configured to retract (or pivot) to open the inner channel 2411 at one end (e.g., the bottom end of the channel) such that liquid can enter the channel at that end. As such, the corresponding weights are not configured for controlled movement along pipe 2420. Valve 2412 of weight 2410e is shown in a closed state. According to one embodiment, in the closed state, the valve has been configured to extend (or pivot) to close off the inner channel 2411 at one end (e.g., the bottom end of the channel) such that liquid can not enter the channel at that end. Similar to the control of the protruding members of the grapple 1000, as described with reference to FIG. 10, the valves 2412 are controllable to be placed in the open or closed state. According to one embodiment, the valves have actuators that, in a further embodiment, are manually controllable or electronically controllable.

As described above, each of the weights may include an operable valve 2412, which (in its open state) provides entry of the liquid into the inner volume 2411. When the valve 2412 is closed, the valve 2412 impedes entry of the liquid into the inner volume. The storage of energy and the accompanying release of stored energy in the system of FIG. 24 may be conducted in a manner similar to that described with reference to FIGS. 23A and 23B.

With reference to FIG. 24, during both energy-storage and energy-release phases of operation, the valve 2412 in the weight (or weights) that is selected to be raised (or lowered) in the shaft 2420 is placed in its closed state (see, for example, the valve 2412 of weight 2410e in FIG. 24, which is in a closed state. As a result, weight 2410e moves in a downward direction along pipe 2420, thereby incrementally increasing the pressure of the liquid delivered to pump-turbine 2440.

Also, during both energy-storage and energy-release phases of operation, the valve 2412 in the weight (or weights) that is selected to remain stationary is placed in its open state (see, for example, the valve 2412 of weight 2410a in FIG. 24). As a result, the position of weight 2410a in pipe 2420 remains generally stable.

In embodiments described above, liquid pressure is produced underneath a body (e.g., weight 2310 of FIG. 23A) that is formed of a material that has a density higher than that of the liquid flowing in the pipe. In addition, liquid pressure may be produced above a body—e.g., a body formed of a material that has a density that is less than that of the liquid flowing in the pipe. Such pressure can be formed in the system 250, which will now be described with reference to FIG. 25. The system includes motor/generator 2550, pump-turbine 2540, weight 2510, pressure seals 2530 and pipe 2520. In one embodiment, one or more of these structures is similar to corresponding structure(s) in the system of FIG. 23. The system also includes shaft structure 2560. The shaft 2560 includes, for example, but not limited to, a generally cylindrical pipe made of a suitable rigid material, such as, but not limited to metal, plastic, a composite material or the like. The shaft 2560 has a central channel in which a vessel 2570 is supported for movement between a first position (shown in FIG. 25) and a second position at an upper end of pipe 2560 (not shown). The vessel 2570 may have a shape of a capsule, cylinder, sphere, a box, or other shapes.

According to one embodiment, the vessel 2570 is a generally hollow, water-tight, closed container that contains a material less dense than the pressurizing liquid (e.g., air). According to one embodiment, the vessel 2570 is an air vessel, and air pressure within the vessel 2570 may be configured to offset the external pressure of the liquid to prevent the vessel 2570 from collapsing. Pressure seals 2580 are positioned on vessel 2570. Similar in function to the seals 2330 of FIG. 23, the pressure seals 2580 of one embodiment are sized to at least cover a gap between the vessel 2570 and the inner periphery of pipe 2560 to form a water-tight seal therebetween.

Figure 25:
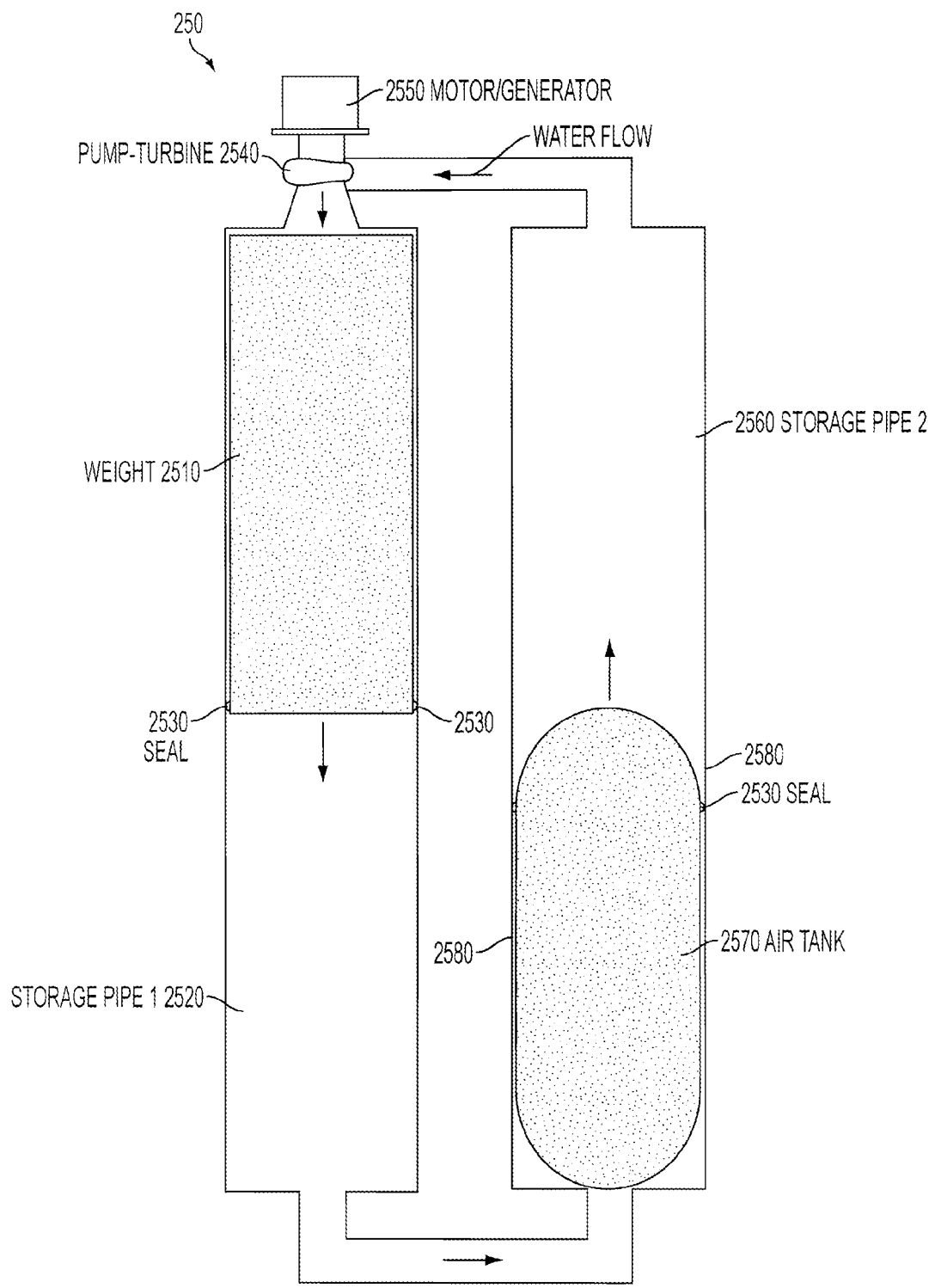
FIG. 25 depicts an energy storage system according to one embodiment.

With reference to FIG. 25, to release stored energy, a system facilitates the downward movement of weight 2510, which, similar to weight 2310 of FIG. 23A, is composed of a material that is more dense than the liquid beneath the weight 2510. The pressurizing force caused by the downward movement of weight 2510 along shaft 2520 may be augmented by the pressurizing force caused by the upward movement of buoyant vessel 2570 along shaft 2560. The vessel 2570 contains a material that is less dense that the liquid flowing in the shafts 2520 and 2560.

In an alternative embodiment, the system employs the buoyant vessel 2570 but not the weight 2510 in the storage of energy and the release of the stored energy. Similar to embodiments previously described, the vessel 2570 of this alternative embodiment contains a material having a lower density than the surrounding liquid. Energy is stored when the turbine increases the pressure of the fluid along a direction opposite to the arrows indicated in FIG. 23A in shaft 2540. As a result, pressure in the fluid above vessel 2530 is increased, pushing the vessel 2530 toward the lower end of shaft 2540 As such, energy is stored in the system 250 (see, for example, the configuration of FIG. 25).

Figure 26:
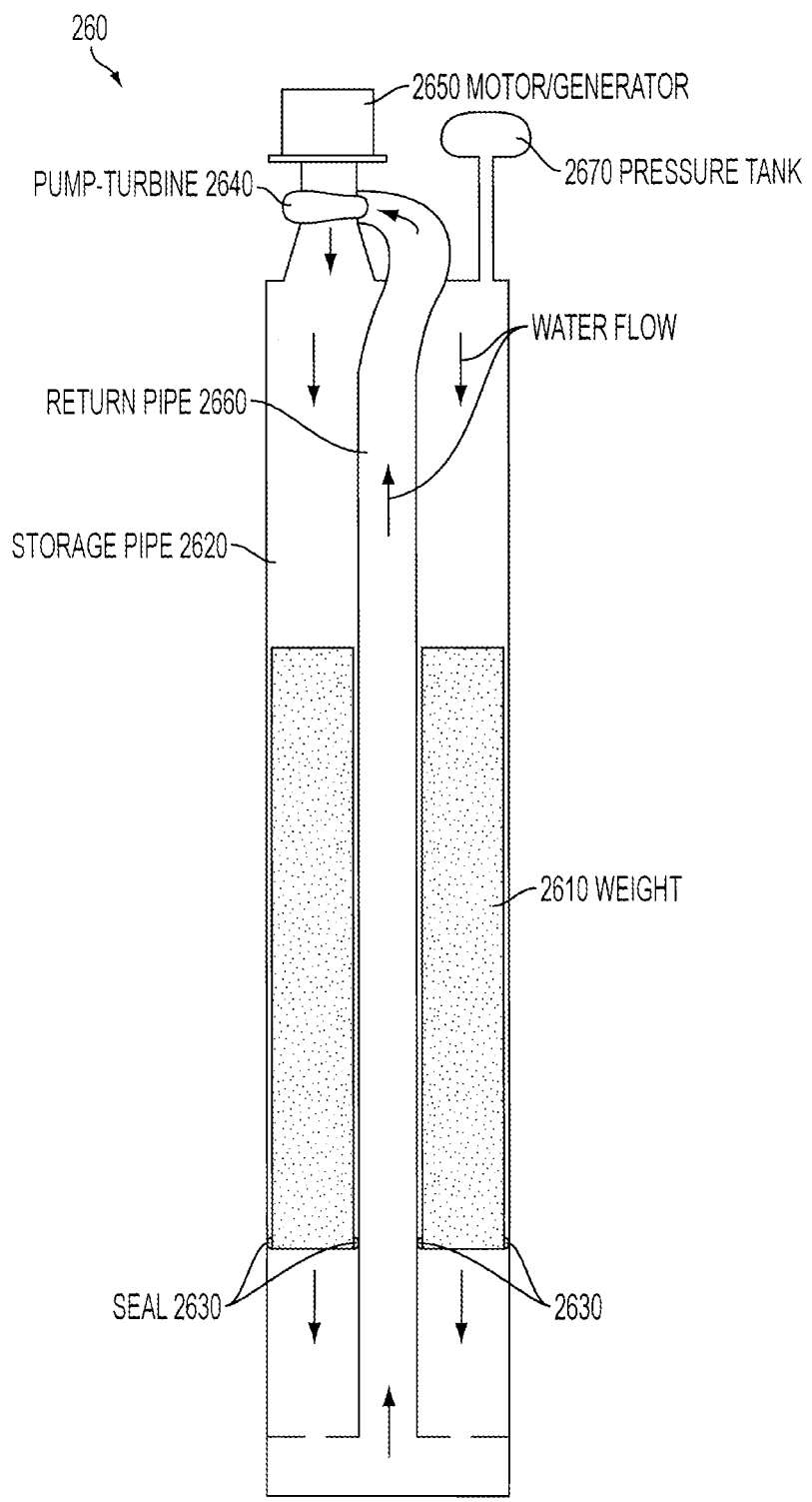
FIG. 26 depicts an energy storage system according to one embodiment.

With reference to FIG. 26, another embodiment is shown. Features of this embodiment include an integrated structure that may be configured relatively compactly. In this embodiment, a system 260 includes motor/generator 2650, pump-turbine 2640, a return pipe 2660 and pressure seals 2630. In one embodiment, one or more of these structures is similar to corresponding structure(s) in the system of FIG. 23. The system 260 also includes a pipe 2620. The storage pipe 2620 includes, without limitation, a generally cylindrical pipe made of a suitably rigid material such as, but not limited to, metal, plastic, a composite material or the like. The cylindrical pipe of the storage pipe 2620 defines an inner channel through which at least a portion of the return pipe 2660 extends. In one embodiment, the weight 2610 is sized to move within the pipe 2620, and, as such, has a shape generally conforming with an inner volume of the pipe 2620. According to one embodiment, sliding pressure seals 2630 are positioned on the weight 2610 to at least span a gap between the weight 2610 and the storage pipe 2620. The seals 2630 prevent pressurized fluid from flowing past the seal.

In the configuration illustrated in FIG. 26, energy is released as the weight 2610 moves in a downward direction along the pipe 2620. The mass of the weight 2610 forces the liquid to flow out through the pipe 2620 and through the pipe 2660 in the direction of the arrows indicated in FIG. 26 in the pipe 2660. The flow of the liquid drives the pump 2640, which causes the motor/generator 2650 to produce electric power to be transmitted, for example, to a power grid.

According to a further embodiment, pressure tank 2670 is provided at one end of the storage pipe 2620. The pressure tank 2670 may contain compressed air or a suitable gas. As such, the pressure tank 2670 allows the absolute pressure on the turbine output to be increased, thereby preventing cavitation and the resulting damage to turbine components.

Figure 27:
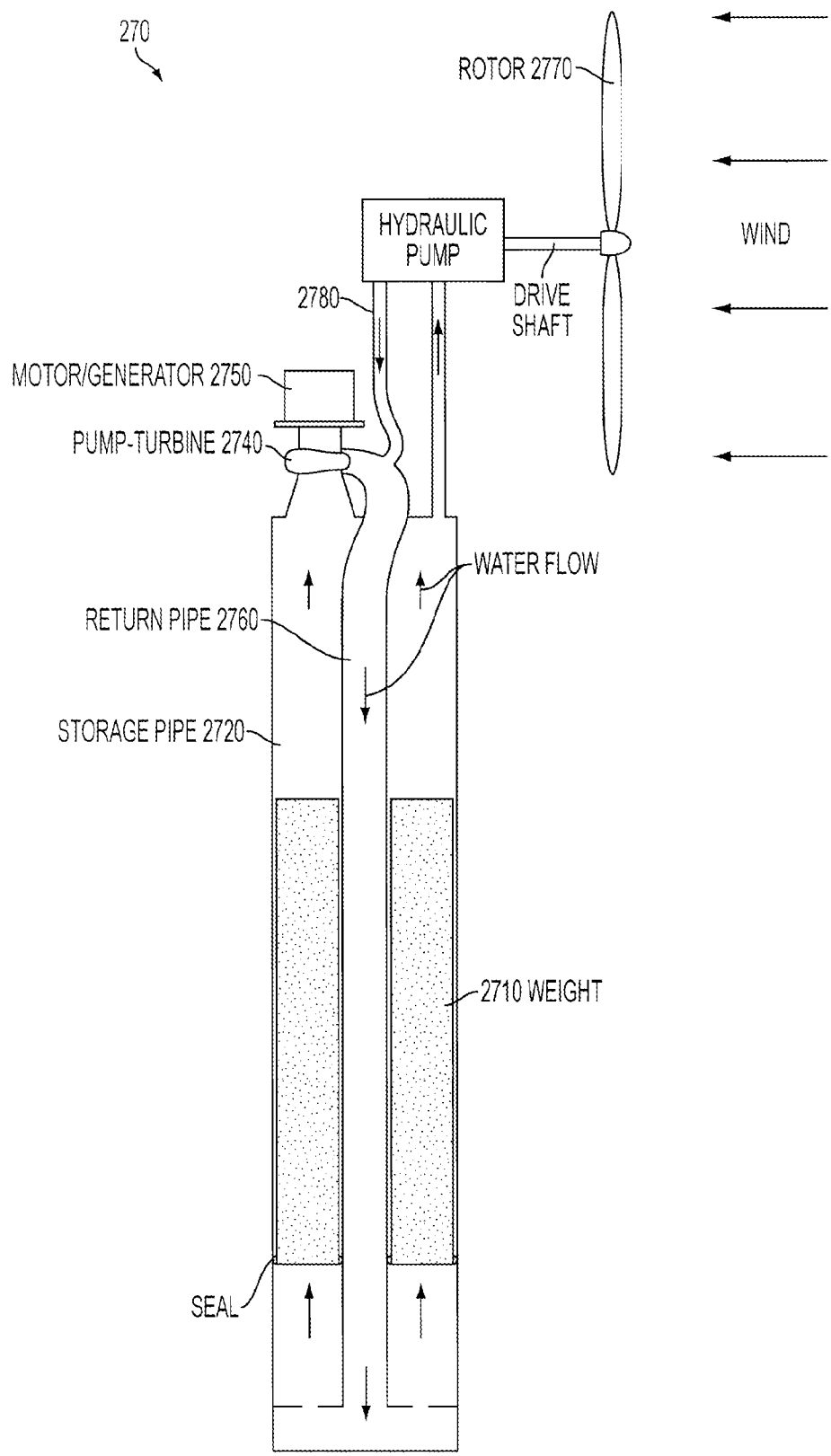
FIG. 27 depicts an energy storage system according to one embodiment.

According to one embodiment, wind energy may be used to drive systems including systems such as the system 260 of FIG. 26. With reference to FIG. 27, a schematic representation of an embodiment of a wind-powered system 270 is shown. According to this embodiment, the wind turbine 2700 drives a hydraulic pump 2770 to pump hydraulic fluid (e.g., water) through a pressure hose 2780 and to return pipe 2760. The pressure of the water forces weight 2710 to move up along storage pipe 2720. The use of hydraulic pump 2770 may help eliminate the efficiency losses associated with using an electric pump (e.g., the efficiency losses incurred by converting wind energy to electricity (for operating the electric pump) and then converting the electricity back to mechanical energy (in the electric pump)). Further, fluid pressure provided by the wind turbine 2700 to pump-turbine 2740 (via pressure hose 2780) can be combined with fluid pressure provided from the downwardly-moving storage weight 2710 to pump-turbine 2740 (via return pipe 2760) to drive the pump-turbine, thereby spinning the motor/generator 2750 and providing electricity, for example, to a power grid. This helps to eliminates the need for a generator directly coupled to the wind turbine tower. Because such a generator may be heavy and/or expensive, eliminating the need for such a generator decreases the structural requirements and/or costs of the system.

Figure 28:
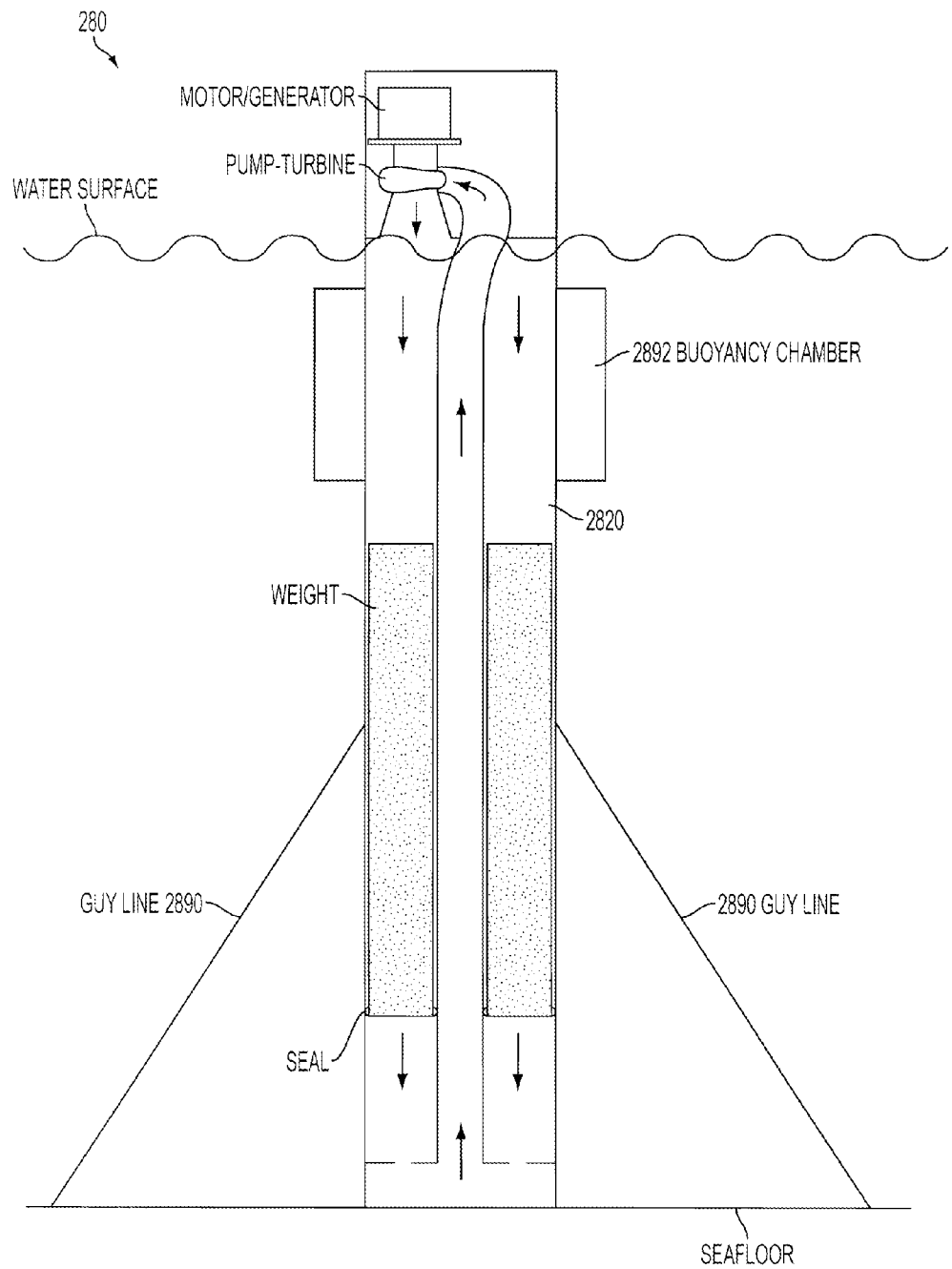
FIG. 28 depicts an energy storage system according to one embodiment.

According to another embodiment, with reference to FIG. 28, a system 280 similar to the system 260 of FIG. 26 can be configured for installation in an aquatic site. According to one embodiment, the storage pipe 2820 may be configured to rest on the floor of the aquatic body (e.g., an ocean). Guy lines 2890 (which, according to one embodiment, are similar to mooring lines 1250 of FIG. 12) serve to anchor the system to the floor and aid in maintaining the system in a generally vertical orientation. According to a further embodiment, one or more buoyancy chambers 2892 are provided at (or near) the upper end of the system to aid in maintaining the generally vertical orientation of the system. According to one embodiment, the buoyancy chambers 2892 are floatable members that are generally hollow and that contain a material having a density less than that of water. According to one embodiment, the buoyancy chamber 2892 is formed of a rigid, durable material such as, but not limited to, metal, plastic, a composite material or the like. According to one embodiment, with reference to FIG. 28, the top of the system is positioned above the ocean surface to, for example, provide a platform on which a wind turbine can be supported. According to other embodiments, the system may be completely submerged in the aquatic body, to reduce the susceptibility of the system to wind and tidal forces.

Figure 29:
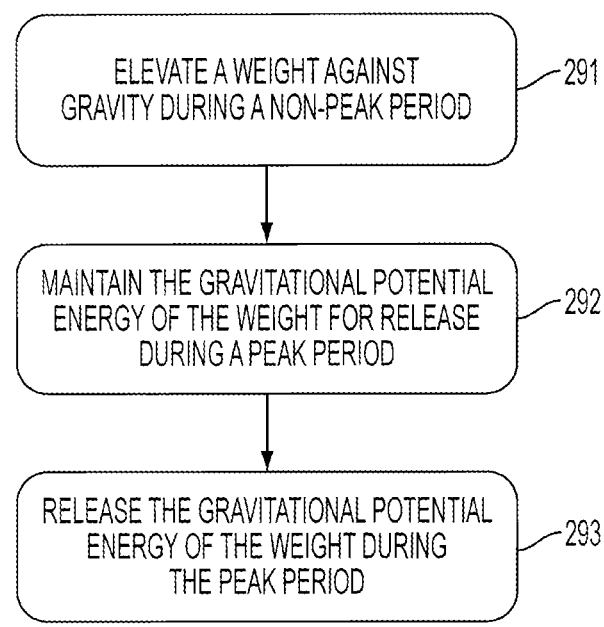
FIG. 29 illustrates a method of storing energy according to one embodiment.

With reference to FIG. 29, a method of storing energy according to one embodiment will now be described. As shown in step 291, a storage weight is elevated against gravity from a first elevation to a second elevation during an off-peak period, when energy demand is lower relative to a peak period. As such, the gravitational potential energy of the storage weight is increased. As shown in step 292, the gravitational potential energy of the storage weight is maintained for release during a peak period. According to a further embodiment, as shown in step 293, the gravitational potential energy of the storage weight is released during the peak period. The storage weight may be lowered with gravity such that its gravitational potential energy is released.

Embodiments of the present invention are directed to energy storage systems that can serve as reliable, dispatchable baseload power supplies, as well as intermittent power supplies. In particular embodiments, the systems may harness energy produced by renewable sources, such as that collected by solar collectors and wind turbines. According to embodiments of the present invention, a significant fraction of the output from solar and/or wind sources is directed into large-scale energy storage units, which may then release that energy at a later time (e.g., on an as-needed basis).

Although certain embodiments that have been described above are directed to systems by which "off-peak" energy is stored for subsequent "peak" usage, embodiments of the invention are also directed to systems for frequency regulation, or regulation, of energy generation. In such systems, differences between the levels of the energy generated and the levels of energy demanded are balanced to reduce or minimize such differences. According to such embodiments, the path along which a storage weight (e.g., a weight similar to storage weight 202 of FIG. 2) may travel may have a suitable vertical length such as, but not limited to, a length of around 200 meters or more. In a particular embodiment, the vertical length of the path is between approximately 200 meters and 400 meters.

The foregoing description of certain embodiments of the invention has been presented for the purposes of illustration and description. It is not intended to be exhaustive or to limit the invention to the precise form disclosed. Many modifications and variations are possible in light of the above teachings. Therefore, it is intended that the scope of the invention be limited not by this detailed description, but rather by the claims appended hereto.

What is claimed is:

1. A system for storing energy, the system comprising:
at least one body;
a hollow shaft structure having an interior volume containing a fluid, the at least one body being disposed within the interior volume of the hollow shaft structure for movement with gravity from a first elevation position to a second elevation position within the interior volume of the hollow shaft structure, to force fluid out of a first portion of the interior volume of the hollow shaft structure by the movement of the at least one body from the first elevation position to the second elevation position, the first portion of the interior volume of the hollow shaft structure being located vertically below the at least one body;
a fluid return path structure coupled in fluid flow communication with the hollow shaft structure, for receiving fluid forced out of the first portion of the interior volume of the hollow shaft structure when the at least one body moves from the first elevation position to the second elevation position within the interior volume of the hollow shaft structure;
an electrical energy generator operatively coupled with the fluid return path structure to receive a drive force from fluid received by the fluid return path structure from the first portion of the interior volume of the hollow shaft structure, to drive the electrical energy generator to generate electricity upon movement of the at least one body from the first elevation position to the second elevation position.

2. A system as recited in claim 1, further comprising a fluid flow connection between the fluid return path structure and a second portion of the interior volume of the hollow shaft structure, the second portion of the interior volume of the hollow shaft structure being located vertically above the at least one body.

3. The system of claim 1, further comprising a fluid pump or turbine coupled in fluid communication with the fluid return path structure and mechanically connected with the electrical energy generator, for receiving fluid pressure from the fluid return path structure and driving the electrical energy generator to generate electricity upon movement of the at least one body by gravity from the first elevation position to the second elevation position.

4. The system of claim 1, further comprising a fluid pump or turbine coupled in fluid communication with the fluid return path structure and mechanically connected with the electrical energy generator, wherein the electrical energy generator has an electrical motor mode for driving the fluid pump or turbine to force fluid into the return path structure and increase fluid pressure in the first portion of the interior volume of the hollow shaft structure by an amount sufficient to move the at least one body from the second elevation position toward the first elevation position.

5. The system of claim 1, wherein the return path structure comprises a fluid pipe coupled at one end to the first portion of the hollow shaft structure and at a second end to a fluid pump or turbine.

6. The system of claim 1, further comprising a fluid pump or turbine coupled in fluid communication with the fluid return path structure and mechanically connected with the electrical energy generator, wherein the return path structure comprises a fluid pipe coupled at one end to the first portion of the hollow shaft structure and at a second end to the fluid pump or turbine, for conveying fluid pressure between the first portion of the hollow shaft structure and the fluid pump or turbine.

7. The system of claim 1 further comprising at least one seal arranged to inhibit fluid flow across the at least one body, between the first portion of the interior volume of the hollow shaft structure and a second portion of the interior volume of the hollow shaft structure that is located vertically above the at least one body.

8. The system of claim 1, wherein the at least one body comprises a body having a fluid flow passage extending through the body and a fluid valve located within the passage to selectively allow or inhibit fluid flow through the passage.

9. The system of claim 8, wherein the fluid valve is controlled to be closed to inhibit fluid flow through the passage when the body moves with gravity from the second elevation position to the first elevation position.

10. The system of claim 9, wherein the fluid valve is controlled to be open to allow fluid flow through the passage when the body is held in the second elevation position.

11. The system of claim 8, wherein the fluid valve is controlled to be open to allow fluid flow through the passage when the body is held in the second elevation position.

12. A system for storing energy, the system comprising:
at least one body;
a hollow shaft structure having an interior volume for containing a fluid, the at least one body being disposed within the interior volume of the hollow shaft structure for movement with gravity from a first elevation position to a second elevation position within the interior volume of the hollow shaft structure;
a fluid return path structure coupled in fluid flow communication with the hollow shaft structure, for receiving fluid from a first portion of the interior volume of the hollow shaft structure, the first portion of the interior volume of the hollow shaft structure being located vertically below the at least one body; and
an electrical energy generator operatively coupled with the fluid return path structure to drive the electrical energy generator to generate electricity upon movement of the at least one body with gravity from the first elevation position to the second elevation position; and
a fluid flow connection between the fluid return path structure and a second portion of the interior volume of the hollow shaft structure, the second portion of the interior volume of the hollow shaft structure being located vertically above the at least one body.

13. A system as recited in claim 12, wherein the electrical energy generator being disposed at a third elevation position that is higher in elevation than the second elevation position.

14. A system as recited in claim 12, wherein, the electrical energy generator being disposed at a third elevation position that is higher in elevation than the first elevation position.

15. A method for storing energy, the method comprising:
arranging at least one body within an interior volume of a fluid container for movement with gravity within the interior volume of the fluid container from a first elevation position to a second elevation position, to force fluid out of a first portion of the interior volume of the fluid container by the movement of the at least one body from the first elevation position to the second elevation position, the first portion of the interior volume of the fluid container being located vertically below the at least one body;
coupling a fluid return path structure in fluid flow communication with the fluid container, for receiving fluid forced out of the first portion of the interior volume of the fluid container when the at least one body moves from the first elevation position to the second elevation position within the interior volume of the fluid container;
coupling an electrical energy generator with the fluid return path structure to receive a drive force from fluid received by the fluid return path structure from the first portion of the interior volume of the fluid container, to drive the electrical energy generator to generate electricity upon movement of the at least one body from the first elevation position to the second elevation position.

16. The method of claim 15, further comprising coupling a pump in fluid flow communication with the return path structure, to controllably move the at least one body against gravity from the second elevation position to the first elevation position to increase the gravitational potential energy of the at least one body.

17. The method of claim 15, further comprising coupling a fluid pump or turbine in fluid communication with the fluid return path structure and with the electrical energy generator, for receiving fluid pressure from the fluid return path structure and driving the electrical energy generator to generate electricity upon movement of the at least one body by gravity from the first elevation position to the second elevation position.

18. The method of claim 15, further comprising coupling a fluid pump or turbine in fluid communication with the fluid return path structure and with the electrical energy generator; and providing the electrical energy generator with an electrical motor mode for driving the fluid pump or turbine to force fluid into the return path structure and increase fluid pressure in the first portion of the interior volume of the hollow shaft structure by an amount sufficient to move the at least one body from the second elevation position toward the first elevation position.

19. The method of claim 15, wherein the at least one body comprises a body having a fluid flow passage extending through the body and a fluid valve located within the passage to selectively allow or inhibit fluid flow through the passage.

20. The method of claim 19, further comprising configuring the fluid valve to be closed to inhibit fluid flow through the passage when the body moves with gravity from the second elevation position to the first elevation position, and to be open to allow fluid flow through the passage when the body is held in the second elevation position.

21. A system as recited in claim 1, wherein the at least one body is disposed within the first portion of the interior volume of the hollow shaft structure for movement with gravity within the first portion of the interior volume of the hollow shaft structure from the first elevation position to a second elevation position.

22. A system as recited in claim 1, wherein the first elevation position is at a first end of the first portion of the interior volume of the hollow shaft structure, and the second elevation position is at a second end of the first portion of the interior volume of the hollow shaft structure, and wherein the fluid is between the at least one body and the second end of the first portion of the interior volume when the at least one body is in the first elevation position.

* * * * *